(12) United States Patent
Wu et al.

(10) Patent No.: US 12,046,012 B2
(45) Date of Patent: Jul. 23, 2024

(54) FACE DETECTION METHOD, APPARATUS, AND DEVICE, AND STORAGE MEDIUM

(71) Applicant: Tencent Technology (Shenzhen) Company Limited, Shenzhen (CN)

(72) Inventors: Wenqi Wu, Shenzhen (CN); Zexiong Ye, Shenzhen (CN); Wanpeng Xiao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 478 days.

(21) Appl. No.: 17/325,862

(22) Filed: May 20, 2021

(65) Prior Publication Data

US 2021/0326574 A1 Oct. 21, 2021

Related U.S. Application Data

(63) Continuation of application No. PCT/CN2019/127003, filed on Dec. 20, 2019.

(30) Foreign Application Priority Data

Jan. 2, 2019 (CN) .......................... 201910002499.2

(51) Int. Cl.
*G06V 40/16* (2022.01)
*G06F 18/20* (2023.01)
(Continued)

(52) U.S. Cl.
CPC .............. *G06V 10/25* (2022.01); *G06F 18/25* (2023.01); *G06F 18/285* (2023.01); *G06N 3/08* (2013.01);
(Continued)

(58) Field of Classification Search
CPC ...... G06V 10/25; G06V 10/454; G06V 10/82; G06V 40/161; G06F 18/25; G06F 18/285; G06F 18/24143; G06N 3/08; G06N 3/045
See application file for complete search history.

(56) References Cited

U.S. PATENT DOCUMENTS

| 2018/0068198 A1* | 3/2018 | Savvides ............. G06V 10/454 |
| 2018/0096457 A1  | 4/2018 | Savvides et al. |
| 2018/0150684 A1* | 5/2018 | Wang ...................... G06N 3/08 |

FOREIGN PATENT DOCUMENTS

| CN | 107341517 A | 11/2017 |
| CN | 108460411 A | 8/2018 |

(Continued)

OTHER PUBLICATIONS

Wu et al, Face Detection with Different Scales based on Faster R-CNN, 2018, IEEE Transactions on Cybermetics, 49(11): 4017-4028. (Year: 2018).*

(Continued)

*Primary Examiner* — Aaron W Carter
*Assistant Examiner* — Kathleen M Broughton
(74) *Attorney, Agent, or Firm* — Crowell & Moring LLP

(57) ABSTRACT

Embodiments of this disclosure disclose a face detection method, apparatus, and device, and a storage medium. A face candidate region in a to-be-detected image is determined according to a face detection model including a plurality of stages of convolutional neural networks (CNNs). A small-scale face is determined according to a size parameter, and a particular stage CNN corresponding to the size parameter is selected to perform the face detection. A CNN in different stage is adapted to a different size parameter or a size parameter range.

20 Claims, 14 Drawing Sheets

(51) Int. Cl.
    *G06F 18/25*     (2023.01)
    *G06N 3/08*     (2023.01)
    *G06V 10/25*     (2022.01)
    *G06V 10/44*     (2022.01)
    *G06V 10/82*     (2022.01)

(52) U.S. Cl.
    CPC ............ *G06V 10/454* (2022.01); *G06V 10/82* (2022.01); *G06V 40/161* (2022.01)

(56) References Cited

FOREIGN PATENT DOCUMENTS

| | | |
|---|---|---|
| CN | 108564097 A | 9/2018 |
| CN | 109117876 A | 1/2019 |
| CN | 109753927 A | 5/2019 |

OTHER PUBLICATIONS

Ren et al, Faster R-CNN: Towards Real-Time Object Detection with Region Proposal Networks, 2016, arXiv: 1506.01497v3. pp. 1-14. (Year: 2016).*

Lokanath et al, Accurate object classification and detection by faster-RCNN, 2017, IOP Conf. Series: Materials Science and Engineering 263. pp. 1-9. (Year: 2017).*

Han et al, Multi-scale Deep Representation Learning for Face Detection, 2018, IEEE Visual Communications and Image Processing, pp. 1018-8770. (Year: 2018).*

Wang et al, Robust person head detection based on multi-scale representation fusion of deep convolution neural network, IEEE International Conference on Robotics and Biomimetics, pp. 1-6. (Year: 2017).*

Wu et al, Simultaneous Face Detection and Pose Estimation Using Convolutional Neural Network Cascade, 2018, IEEE Digital Object Identifier, 6(2018): 49563-49575. (Year: 2018).*

Liu et al, Multi-Path Region-Based Convolutional Neural Network for Accurate Detection of Unconstrained "Hard Faces", 2017, 14th Conference on Computer and Robot Vision, pp. 1-8. (Year: 2017).*

Hao et al, Scale-Aware Face Detection, 2017, IEEE Conference on Computer Vision and Pattern Recognition, pp. 1913-1922. (Year: 2017).*

Extended European Search Report issued on application EP19906810.7 on Apr. 11, 2022, 12 pages.

Khan, Gulraiz et al., "Multi-Person Tracking Based on Faster R-CNN and Deep Appearance Features", IntechOpen, Visual Object Tracking in the Deep Neural Networks Era, Jan. 1, 2019, 23 pages.

International Search Report and Written Opinion with English Translation for International Patent Application No. PCT/CN2019/127003 dated Mar. 17, 2020; 13 pages.

\* cited by examiner

FACE DETECTION METHOD, APPARATUS, AND DEVICE, AND STORAGE MEDIUM

RELATED APPLICATION

This application is a continuation application of the International PCT Application No. PCT/CN2019/127003, filed with the China National Intellectual Property Administration, PRC on Dec. 20, 2019 which claims priority to Chinese Patent Application No. 201910002499.2, filed with the China National Intellectual Property Administration, PRC on Jan. 2, 2019, both of which are incorporated herein by reference in their entireties.

FIELD OF THE TECHNOLOGY

This application relates to the field of image processing, and in particular, to a face detection method, apparatus, and device, and a storage medium.

BACKGROUND OF THE DISCLOSURE

Face detection is an important research hot issue in the field of computer vision, and a main task of the face detection is to detect a face from an image.

It is important to improve the precision and the speed of the face detection from different perspectives.

SUMMARY

An embodiment of this disclosure provides a face detection method, performed by a computing device, the method including:
  determining a face candidate region in a to-be-detected image according to a face detection model, the face detection model including a plurality of stages of convolutional neural networks;
  determining that the face candidate region corresponds to a small-scale face in a case that a size parameter of the face candidate region is less than a first proportion condition;
  obtaining, by using a detection model corresponding to the small-scale face, projection features of the face candidate region on feature maps outputted by at least two stages of convolutional neural networks in the face detection model, the at least two stages of convolutional neural networks including a first convolutional neural network and a second convolutional neural network, a feature resolution of a feature map outputted by the first convolutional neural network being applicable to the size parameter, an adjacent-stage convolutional neural network of the first convolutional neural network being the second convolutional neural network, and a feature resolution of a feature map outputted by the second convolutional neural network being lower than the feature resolution of the feature map outputted by the first convolutional neural network;
  using a fused feature obtained by fusing a projection feature of the first convolutional neural network and a projection feature of the second convolutional neural network as a projection feature of the first convolutional neural network; and
  performing face detection on the face candidate region according to the projection features on the feature maps outputted by the at least two stages of convolutional neural networks.

An embodiment of this disclosure provides a face detection method, performed by a computing device, the method including:
  determining a face candidate region in a to-be-detected image according to a face detection model;
  determining a target scale of a face corresponding to the face candidate region according to a size relationship between a size parameter of the face candidate region and a proportion condition, the target scale being one of a plurality of scales, and faces in different scales corresponding to different detection models; and
  performing face detection on the face candidate region according to a detection model corresponding to the face in the target scale.

An embodiment of this disclosure provides a face detection apparatus, including:
  a first determining unit, configured to determine a face candidate region in a to-be-detected image according to a face detection model, the face detection model including a plurality of stages of convolutional neural networks;
  a second determining unit, configured to determine that the face candidate region corresponds to a small-scale face in a case that a size parameter of the face candidate region is less than a first proportion condition; and
  a first detection unit, configured to:
    obtain, by using a detection model corresponding to the small-scale face, projection features of the face candidate region on feature maps outputted by at least two stages of convolutional neural networks in the face detection model, the at least two stages of convolutional neural networks including a first convolutional neural network and a second convolutional neural network, a feature resolution of a feature map outputted by the first convolutional neural network being applicable to the size parameter, an adjacent-stage convolutional neural network of the first convolutional neural network being the second convolutional neural network, and a feature resolution of a feature map outputted by the second convolutional neural network being lower than the feature resolution of the feature map outputted by the first convolutional neural network;
    use a fused feature obtained by fusing a projection feature of the first convolutional neural network and a projection feature of the second convolutional neural network as a projection feature of the first convolutional neural network; and
    perform face detection on the face candidate region according to the projection features on the feature maps outputted by the at least two stages of convolutional neural networks.

An embodiment of this disclosure provides a face detection apparatus, including:
  a first determining module, configured to determine a face candidate region in a to-be-detected image according to a face detection model;
  a second determining module, configured to determine a target scale of a face corresponding to the face candidate region according to a size relationship between a size parameter of the face candidate region and a proportion condition, the target scale being one of a plurality of scales, and faces in different scales corresponding to different detection models; and
  a detection module, configured to perform face detection on the face candidate region according to a detection model corresponding to the face in the target scale.

An embodiment of this disclosure provides a face detection device, including a processor and a memory, the memory being configured to store program code and transmit the program code to the processor; and the processor being configured to perform the foregoing face detection method according to instructions in the program code.

An embodiment of this disclosure provides a computer-readable storage medium, storing program code, the program code being executable by a processor to implement the foregoing face detection method.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other accompanying drawings from these accompanying drawings without creative efforts.

DESCRIPTION OF EMBODIMENTS

The following describes the embodiments of this disclosure with reference to accompanying drawings.

Figure 1A:
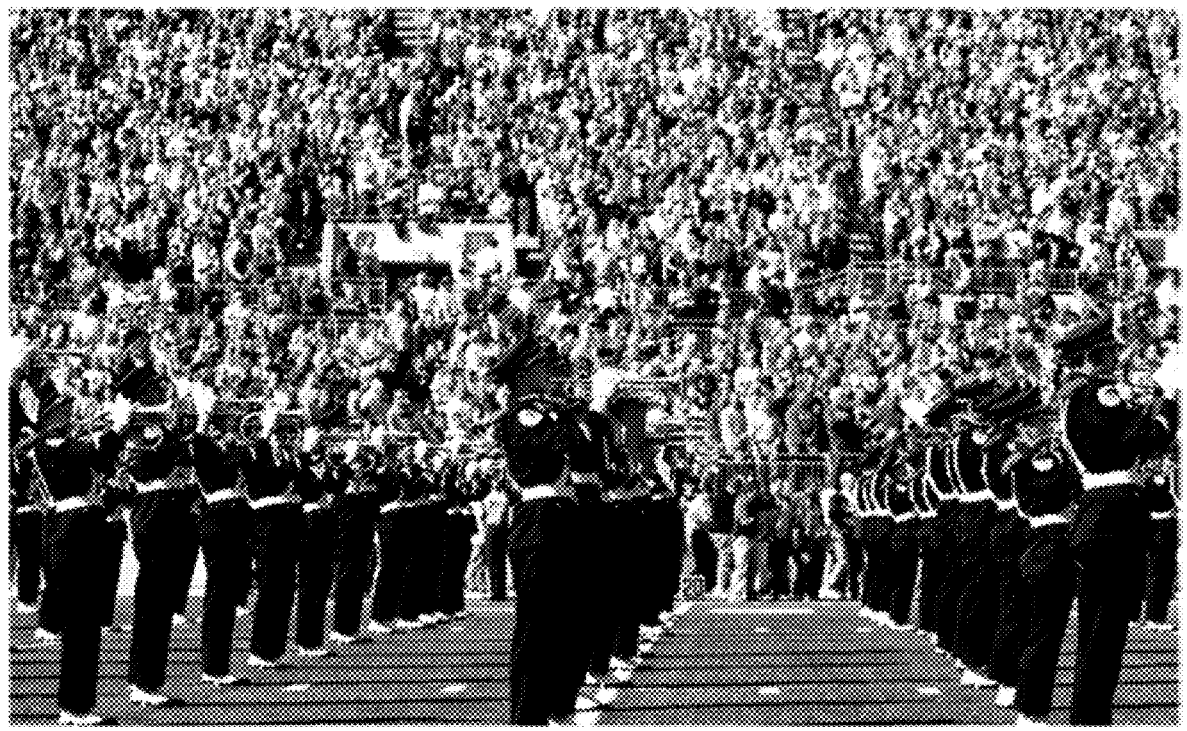
FIG. 1a is a schematic diagram of a to-be-detected image according to an embodiment of this disclosure.

It is important to improve detection precision for small-scale faces in an image such as an image shown in FIG. 1 especially for small-scale faces on the bleachers in FIG. 1.

The inventor of the present disclosure finds during research that, in a conventional face detection method, a feature of a face candidate region may be extracted by using a plurality of stages of convolutional neural networks, and face recognition may be performed based on a feature outputted by the last stage of convolutional neural network. When the feature of the face candidate region is extracted by using the plurality of stages of convolutional neural networks, the feature is generally extracted in a stage-by-stage manner (e.g., for lower stage to higher stage), and a latter stage of convolutional neural network continues extraction based on a feature outputted by a former stage of convolutional neural network to obtain a feature carrying more semantic information. A process that the latter stage of convolutional neural network continues extraction based on the feature outputted by the former stage of convolutional neural network is actually to downsample the feature outputted by the former stage of convolutional neural network. Therefore, a feature resolution corresponding to the feature outputted by the latter stage of convolutional neural network is lower than a feature resolution corresponding to the feature outputted by the former stage of convolutional neural network. As a result, a feature resolution corresponding to a feature outputted by the last stage of convolutional neural network is the lowest among feature resolutions corresponding to features outputted by the plurality of stages of convolutional neural networks. When small-scale faces are recognized, a requirement for the feature resolution is relatively high, but the feature resolution corresponding to the feature outputted by the last stage of convolutional neural network is generally not high. That is to say, the feature resolution corresponding to the feature outputted by the last stage of convolutional neural network generally cannot meet the feature resolution requirement when recognizing the small-scale faces. Therefore, the small-scale faces generally cannot be well recognized by using a conventional method.

The plurality of stages of convolutional neural networks extract the feature in the foregoing stage-by-stage manner, so that when the feature of the face candidate region is extracted by using the plurality of stages of convolutional neural networks, a feature resolution corresponding to a feature outputted by a lower stage of convolutional neural network is generally higher but carries less semantic information; whereas a feature resolution corresponding to a feature outputted by a higher stage of convolutional neural network is lower but carries more semantic information.

For the lower stage of convolutional neural network and the higher stage of convolutional neural network, the lower stage and the higher stage mentioned herein may be relative concepts. For example, a first stage of convolutional neural network first extracts the feature of a face candidate region, a second stage of convolutional neural network continues to extract the feature of the face candidate region based on a feature outputted by the first stage of convolutional neural network, the first stage of convolutional neural network is considered to be a lower stage of convolutional neural network relative to the second stage of convolutional neural network, and the second stage of convolutional neural network is considered to be a higher stage of convolutional neural network relative to the first stage of convolutional neural network.

In view of this, in the embodiments of this disclosure, considering that a correlation between features outputted by adjacent stages of convolutional neural networks is relatively high, detection of the small-scale faces may be performed by using the features of the face candidate region outputted by at least two adjacent stages of convolutional neural networks. Specifically, feature fusion may be performed on the features of the face candidate region outputted by the at least two adjacent stages of convolutional neural network, a fused feature may be used as an outputted feature of the lower stage of convolutional neural network, and then face detection is performed on the face candidate region with reference to the outputted feature of the at least two adjacent stages of convolutional neural networks. The fused feature obtained through fusion not only includes the relatively high feature resolution represented by the feature extracted by the lower stage of convolutional neural network, but also carries the semantic information carried in the feature extracted by the higher stage of convolutional neural network, thereby helping to detect the small-scale faces.

Figure 1B:
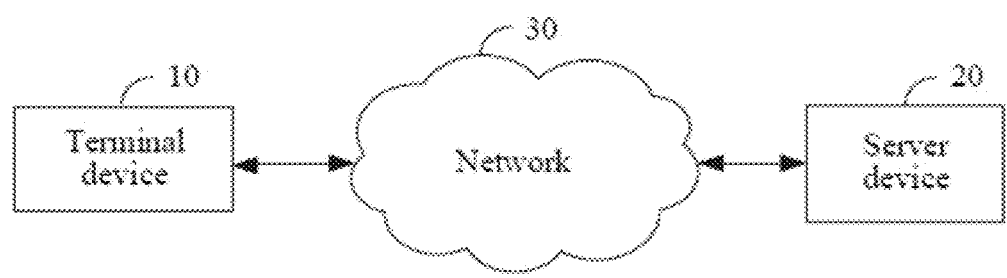
FIG. 1b is a schematic diagram of an exemplary implementation environment of a face detection method according to an embodiment of this disclosure.

FIG. 1b is a schematic diagram of an implementation environment of a face detection method according to an embodiment of this disclosure. A terminal device 10 is in communication connection with a server device 20 through a network 30, and the network 30 may be a wired network or a wireless network. A face detection apparatus provided in any embodiment of this disclosure is integrated in the terminal device 10 and the server device 20, to implement the face detection method provided in any embodiment of this disclosure. Specifically, the terminal device 10 may directly perform the face detection method provided in any embodiment of this disclosure; or the terminal device 10 may send a to-be-detected image to the server device 20, and the server device 20 performs the face detection method provided in any embodiment of this disclosure and returns a detection result to the terminal device 10.

The face detection method provided in the embodiments of this disclosure is described below with reference to the scenario shown in FIG. 2.

Figure 2:
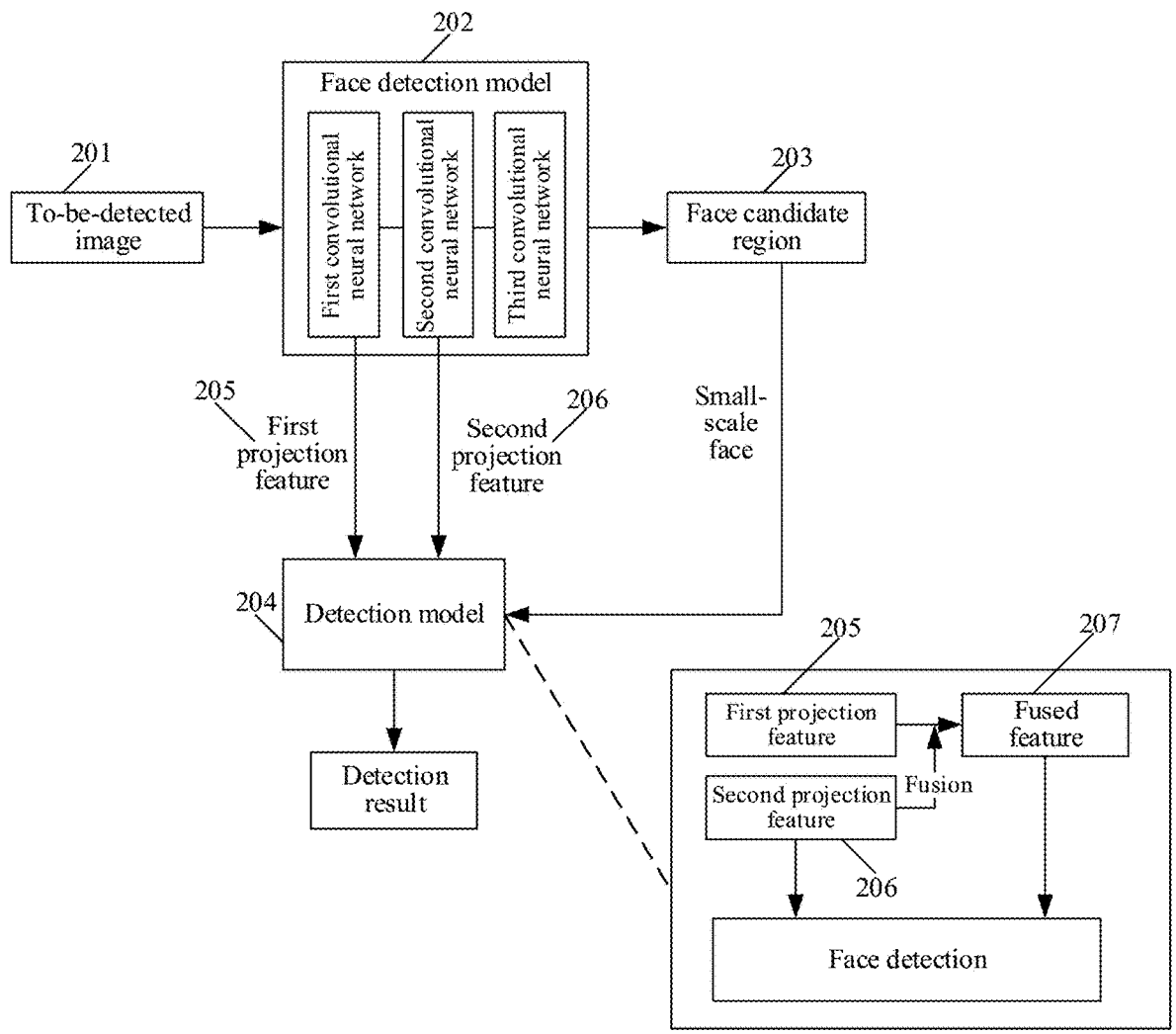
FIG. 2 is a schematic diagram of an exemplary scenario according to an embodiment of this disclosure.

In the scenario shown in FIG. 2, a face candidate region 203 in a to-be-detected image 201 may be determined by using a face detection model 202.

In the embodiments of this disclosure, the face detection model 202 may be configured on a face detection device, for example, a computing device such as a server that may be configured to detect a face.

The face candidate region mentioned in the embodiments of this disclosure refers to a region where a face may be located in the to-be-detected image. It may be understood that, the to-be-detected image 201 may include a plurality of face candidate regions 203. Each face candidate region 203 may correspond to a face.

The face detection model 202 mentioned in the embodiments of this disclosure includes a plurality of stages of a convolutional neural network or convolutional neural networks, and the number of stages of convolutional neural networks included in the face detection model 202 is not specifically limited in the embodiments of this disclosure. Description is made in FIG. 2 by using three stages as an example, but this does not constitute a limitation herein. The number of stages of the convolutional neural networks included in the face detection model 202 may alternatively be another number. For example, the face detection model 202 may include five stages of convolutional neural networks as a VGG16 network does.

A specific implementation on how the face detection model 202 determines the face candidate region in the to-be-detected image 201 is not specifically limited in the embodiments of this disclosure. As an example, the face detection model 202 may extract an image feature of the to-be-detected image 201 and determine the face candidate region 203 by using the image feature.

Generally, there is a slight difference between a size parameter of the face candidate region 203 and a size parameter of a face that may be located in the face candidate region 203, so that the size parameter of the face candidate region 203 may represent the size parameter of the face located in the face candidate region 203. In view of this, in the embodiments of this disclosure, after the face candidate region 203 is determined, whether the face candidate region 203 corresponds to a small-scale face may be determined according to the size parameter of the face candidate region. The size parameter is not specifically limited in the embodiments of this disclosure. For example, the size parameter may be an area of the face candidate region 203; and in another example, the size parameter may be a ratio, for example, a ratio of the number of pixels included in the face candidate region 203 to the number of pixels included in a feature map outputted by the face detection model 202, or the like.

The small-scale face mentioned in the embodiments of this disclosure indicates that the size parameter is less than a first proportion condition or the size parameter is less than a threshold value. The small-scale face is a concept relative to a large-scale face that may be detected by using a face detection method.

In the embodiments of this disclosure, after determining that the face candidate region 203 corresponds to a small-scale face, face detection is performed on the face candidate region 203 by using a detection model 204.

It may be understood that, when the face detection model 202 determines the face candidate region in the to-be-detected image 201, the stages of convolutional neural networks of the face detection model 202 may extract the image feature of the to-be-detected image and output corresponding feature maps. When face detection is performed on the face candidate region 203, the image feature of the face candidate region 203 may be used as reference. Therefore, in the embodiments of this disclosure, when the detection model 204 performs face recognition on the face candidate region 203, the detection model may perform face recognition on the face candidate region 203 with reference to the feature in the face candidate region 203 extracted when the face detection model 202 recognizes the face candidate region in the to-be-detected image 201.

Specifically, in the scenario shown in FIG. 2, the detection model 204 may project the face candidate region 203 onto a feature map outputted by a first convolutional neural network of the face detection model 202 to obtain a first projection feature 205, and project the face candidate region 203 onto a feature map outputted by a second convolutional neural network of the face detection model 202 to obtain a second projection feature 206. Face recognition is then performed on the face candidate region 203 by using the first projection feature 205 and the second projection feature 206. It may be understood that, the first projection feature is the feature of the face candidate region 203 extracted by the first convolutional neural network, and the second projection feature is the feature of the face candidate region 203 extracted by the second convolutional neural network.

In the embodiments of this disclosure, the first convolutional neural network and the second convolutional neural network are adjacent stages of convolutional neural networks. A feature resolution of the feature map outputted by the first convolutional neural network may correspond to, or may be based on the size parameter of the face candidate region 203. That is to say, a resolution requirement for performing face recognition on the face candidate region 203 may be met by using the first projection feature. A feature resolution of the feature map outputted by the second convolutional neural network is lower than the feature resolution of the feature map outputted by the first convolutional neural network. In other words, the second convolutional neural network is a higher stage of convolutional neural network relative to the first convolutional neural network. Accordingly, semantic information carried in the feature map outputted by the second convolutional neural network is more than semantic information carried in the feature map outputted by the first convolutional neural network. The semantic information requirement for performing face recognition on the face candidate region 203 may be met by using the second projection feature.

When the detection model 204 performs face recognition on the face candidate region 203 by using the first projection feature 205 and the second projection feature 206, feature fusion may be performed on the first projection feature 205 and the second projection feature 206 for the purpose of recognizing the face more accurately, to obtain a fused feature 207 both having a higher feature resolution and carrying more semantic information. Then the face detection may be performed on the face candidate region 203 by using the fused feature 207 and the second projection feature 206. Precision of face detection on the face candidate region 203 is improved, that is, detection precision of the small-scale face is improved.

A specific implementation of performing face detection on the face candidate region 203 by using the fused feature 207 and the second projection feature 206 is not specifically limited in the embodiments of this disclosure. As an example, the fused feature 207 and the second projection feature 206 may be used as inputs of a region of interest (ROI) pooling layer to obtain a corresponding detection result.

The face detection method provided in this application is described below by using specific embodiments.

Figure 3:
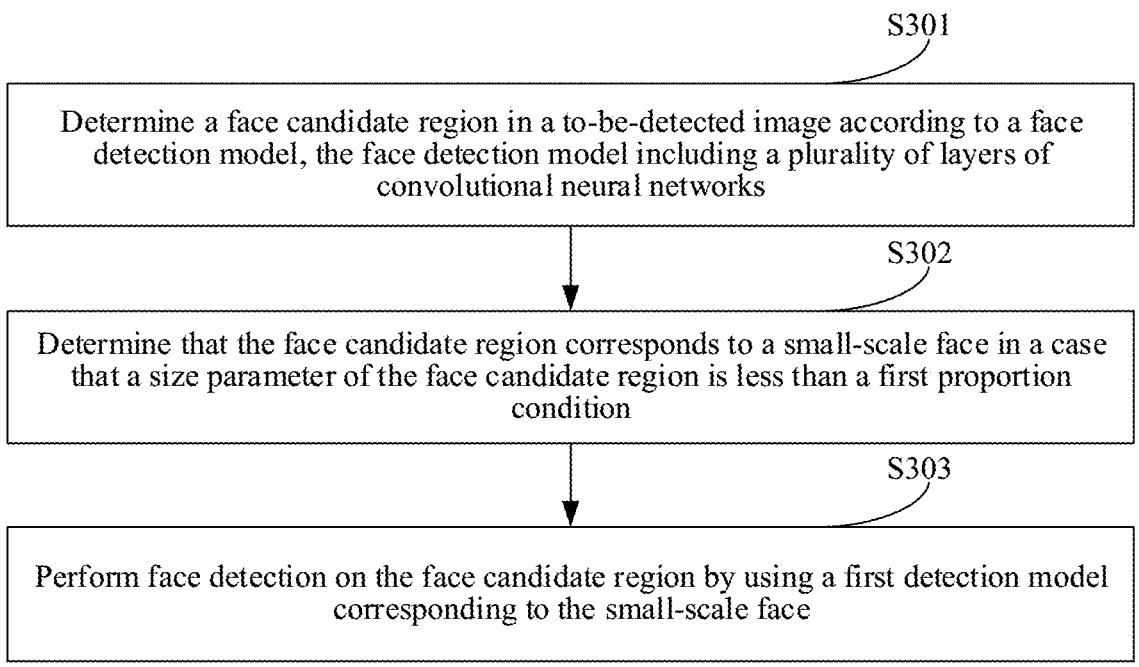
FIG. 3 is a schematic flowchart of an exemplary face detection method according to an embodiment of this disclosure.

FIG. 3 is a schematic flowchart of a face detection method according to an embodiment of this disclosure.

The face detection method provided in the embodiments of this disclosure, for example, may be implemented by using the following steps S301 to S303.

Step S301: Determine a face candidate region in a to-be-detected image according to a face detection model, the face detection model including a plurality of stages of convolutional neural networks. In some embodiments, the face detection model is configured as multiple convolutional neural networks being serially connected, with each convolutional neural network corresponding to a stage.

For description of the face detection model and determining a face candidate region, reference may be made to the description of related content above, and details are not described herein again.

Step S302: Determine that the face candidate region corresponds to a small-scale face when a size parameter of the face candidate region is less than a first proportion condition or a first threshold.

The first proportion condition is not specifically limited in the embodiments of this disclosure, and the first proportion condition may be, for example, a first proportion threshold. As described above, in another example, the size parameter may be a ratio of the number of pixels included in the face candidate region to the number of pixels included in a feature map outputted by the face detection model. Accordingly, a case that the size parameter of the face candidate region is less than the first proportion condition may be that, for example, the size parameter of the face candidate region is less than the first proportion threshold.

For example, a case that the size parameter is less than the first proportion condition may be that, for example, the ratio of the number $w_p * h_p$ of pixels included in the face candidate region to the number $w_{oi} * h_{oi}$ of pixels included in the feature map outputted by the face detection model is less than $\frac{1}{10}$, that is, $$\frac{w_p * h_p}{w_{oi} * h_{oi}} < \frac{1}{10}.$$

The face candidate region may be regarded as a rectangular region, $w_p$ is the number of pixels included by a width of the face candidate region, and $h_p$ is the number of pixels included by a height of the face candidate region. $w_{oi}$ is the number of pixels included by a width of the feature map outputted by the face detection model, and ho, is the number of pixels included by a height of the feature map outputted by the face detection model.

Step S303: Perform face detection on the face candidate region by using a detection model corresponding to the small-scale face.

In one aspect, considering that the small-scale face cannot be accurately detected in the conventional technology for a reason that a feature resolution corresponding to a feature for detecting the small-scale face is relatively low, in the embodiments of this disclosure, when the small-scale face is recognized, a projection feature of a convolutional neural network whose feature resolution is applicable to the size parameter of the face candidate region needs to be used. In some implementations, there is a correspondence relationship between the feature resolution of the convolutional neural network and the size parameter of the face candidate region. A convolutional neural network may be chosen based on the size parameter of the face candidate region. As such, different stage of convolutional neural networks may correspond to different size parameter of the face candidate region.

In another aspect, to accurately detect a face, not only a feature resolution corresponding to a feature used for performing face recognition needs to meet a requirement, but also semantic information carried in the feature used for performing face recognition needs to meet a requirement. For the small-scale face, semantic information carried in the projection feature of the convolutional neural network whose feature resolution is corresponding to the face candidate region is generally not too much. Therefore, the small-scale face may not be accurately recognized by merely using the projection feature of the convolutional neural network whose feature resolution is applicable to the face candidate region, due to the lack of enough sematic information.

In still another aspect, in the plurality of stages of convolutional neural networks included in the face detection model, a projection feature of a higher stage of convolutional neural network carries more semantic information. However, considering that a correlation between features outputted by adjacent stages of convolutional neural networks is relatively high, the face may be recognized more accurately by performing face recognition on the face candidate region by using the features outputted by the adjacent stages of convolutional neural networks. By using adjacent stages, the benefit of better feature resolution from one stage and better semantic information from another stage may be combined.

Therefore, in the embodiments of this disclosure, face detection may be performed on the face candidate region with reference to projection features of at least two stages of convolutional neural networks. The at least two stages of convolutional neural networks include a projection feature of a first convolutional neural network that may meet a resolution requirement, and a projection feature of a second convolutional neural network that may meet a semantic information requirement, to perform face detection on the face candidate region. The first convolutional neural network and the second convolutional neural network are adjacent stages of convolutional neural networks.

Another convolutional neural network other than the first convolutional neural network and the second convolutional neural network in the at least two stages of convolutional neural networks is not limited in the embodiments of this disclosure. As an example, the other convolutional neural network may be a higher stage of convolutional neural network adjacent to the second convolutional neural network.

Figure 4:
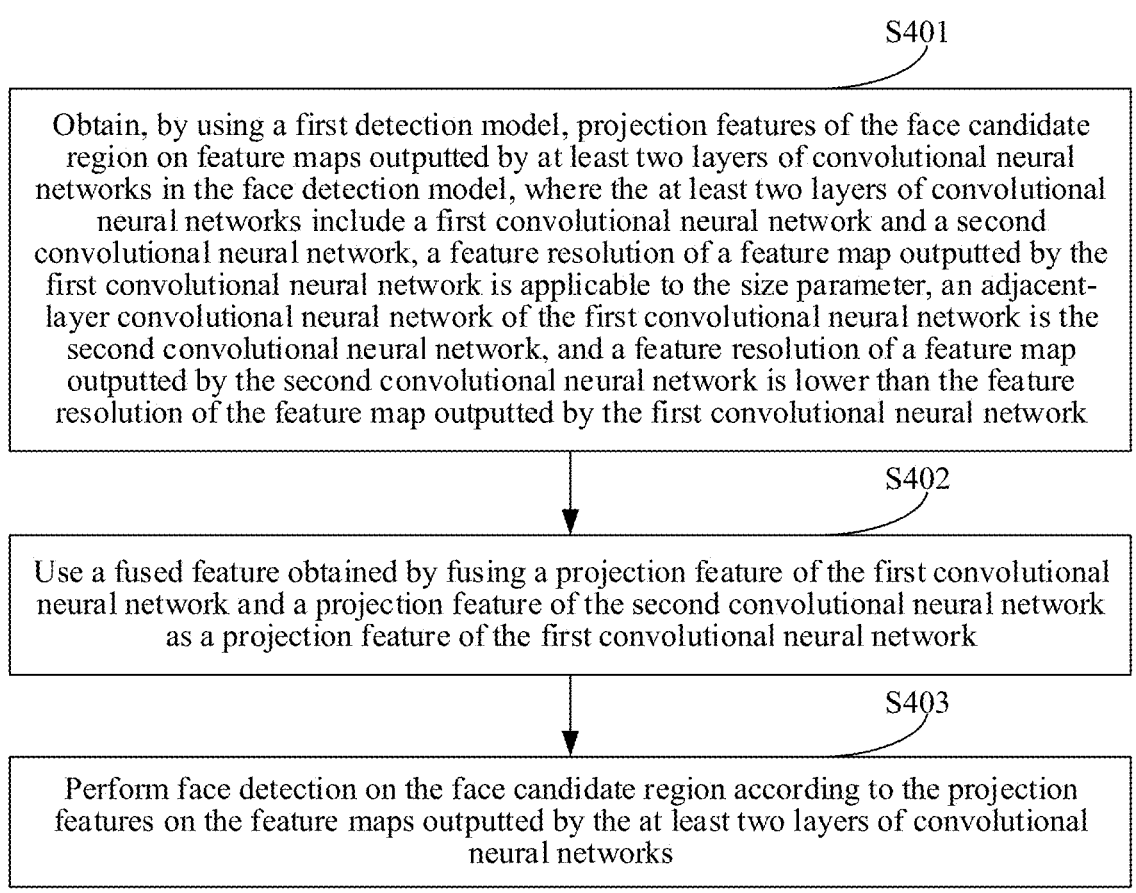
FIG. 4 is a schematic flowchart of a method for performing face detection by using a detection model according to an embodiment of this disclosure.

During specific implementation, step S303 may be implemented through a face detection method described in FIG. 4, and specifically, may be implemented through the following steps S401 to S403.

Step S401: Obtain, by using a detection model, projection features of the face candidate region on feature maps outputted by at least two stages of convolutional neural networks in the face detection model. The at least two stages of convolutional neural networks include a first convolutional neural network and a second convolutional neural network, a feature resolution of a feature map outputted by the first convolutional neural network is corresponding to the size parameter, an adjacent-stage convolutional neural network of the first convolutional neural network is the second convolutional neural network, and a feature resolution of a feature map outputted by the second convolutional neural network is lower than the feature resolution of the feature map outputted by the first convolutional neural network.

In the embodiments of this disclosure, if the feature resolution of the feature map outputted by the first convolutional neural network is corresponding to the size parameter, it indicates that the feature resolution of the feature map outputted by the first convolutional neural network meets the resolution requirement for performing face recognition on the face candidate region.

It may be understood that, if the size parameter differs, the feature resolution corresponding to the size parameter differs, and accordingly, a stage position (or number) of the first convolutional neural network corresponding to the size parameter in the plurality of stages of convolutional neural networks also differs. Therefore, in the embodiments of this disclosure, a specific stage position of the first convolutional neural network in the plurality of stages of convolutional neural networks may be determined according to the size parameter of the face candidate region. For example, according to a correspondence between a size parameter range and a stage position of a convolutional neural network, the first convolutional neural network corresponding to the size parameter range may be determined. For example, the face detection model includes five stages of convolutional neural networks, where the five stages of convolutional neural networks are a first stage of convolutional neural network to a fifth stage of convolutional neural network sequentially from a lower stage to a higher stage. When the size parameter is a relatively small size parameter, for example, a first size parameter, considering that the first size parameter requires a relatively high resolution, a lower stage of convolutional neural network, for example, a third stage of convolutional neural network in the five stages of convolutional neural networks may be determined as the first convolutional neural network. When the size parameter is a size parameter greater than the first size parameter, for example, a second size parameter, the second size parameter requires a lower resolution than the resolution required by the first size parameter, so that a convolutional neural network higher than the third stage of convolutional neural network, for example, a fourth stage of convolutional neural network in the five stages of convolutional neural networks may be determined as the first convolutional neural network.

As described above, a feature outputted by a higher stage of convolutional neural network carries more semantic information than a lower stage of convolutional neural network. Meanwhile, a feature resolution corresponding to the feature outputted by the higher stage of convolutional neural network is lower than a feature resolution corresponding to the feature outputted by the lower stage of convolutional neural network. Therefore, a case that the feature resolution of the feature map outputted by the second convolutional neural network is lower than the feature resolution of the feature map outputted by the first convolutional neural network may indicate that the second convolutional neural network is a higher stage of convolutional neural network of the first convolutional neural network; and that semantic information carried in a feature outputted by the second convolutional neural network is more than semantic information carried in a feature outputted by the first convolutional neural network may accordingly represent that the semantic information carried in the feature outputted by the second convolutional neural network may meet the semantic information requirement for performing face recognition on the face candidate region.

In some implementations, the feature map outputted by the convolutional neural network in the face detection model not only includes a feature corresponding to the face candidate region, but also includes features corresponding to other regions in the to-be-detected image, and when face detection is performed on the face candidate region, face detection needs to be performed with reference to the feature corresponding to the face candidate region. In view of this, in the embodiments of this disclosure, the face candidate region may be projected onto the feature map outputted by the convolutional neural network to obtain a projection feature of the face candidate region on the feature map outputted by the convolutional neural network in the face detection model, and the projection feature is the feature corresponding to the face candidate region.

Step S402: Use a fused feature obtained by fusing a projection feature of the first convolutional neural network and a projection feature of the second convolutional neural network as a projection feature of the first convolutional neural network.

The projection feature of the first convolutional neural network mentioned in the embodiments of this disclosure may be understood as a feature corresponding to a projection region of the face candidate region in the feature map outputted by the first convolutional neural network; and the projection feature of the second convolutional neural network may be understood as a feature corresponding to a projection region of the face candidate region in the feature map outputted by the second convolutional neural network. It may be understood that, a feature resolution corresponding to the projection feature of the first convolutional neural network is higher, and the projection feature of the second convolutional neural network carries more semantic information. Therefore, if fusion processing is performed on the projection feature of the first convolutional neural network and the projection feature of the second convolutional neural network, a fused feature having a higher feature resolution and carrying more semantic information may be obtained. Alternatively, the projection feature of the first convolutional neural network may be updated by the fused feature.

It may be understood that, the first convolutional neural network and the second convolutional neural network are adjacent stages of convolutional neural networks, so that a feature correlation between the projection feature of the first convolutional neural network and the projection feature of the second convolutional neural network is high, to make a processing effect of the fusion processing on the projection feature of the first convolutional neural network and the projection feature of the second convolutional neural network better, thereby better helping to accurately detect small-scale faces in the face candidate region.

Step S403: Perform face detection on the face candidate region according to the projection features on the feature maps outputted by the at least two stages of convolutional neural networks.

It may be understood that, in step S403, the fused feature may be used as the projection feature of the first convolutional neural network. Therefore, compared with the projection feature obtained by projecting the face candidate region onto the feature map outputted by the first convolutional neural network, the fused feature further carries more semantic information in addition to having a higher feature resolution. Therefore, after the fused feature is used as the projection feature of the first convolutional neural network, the face in the face candidate region may be accurately detected by performing face detection on the face candidate region by using the projection features on the feature maps outputted by the at least two stages of convolutional neural networks.

In an implementation of the embodiments of this disclosure, the small-scale faces may be divided into a plurality of small-scale faces in different scales. Specifically, a parameter range within which the size parameter is located may be used as a basis for dividing the small-scale faces. Feature resolutions corresponding to size parameters within the same parameter range may be the same and correspond to a feature resolution of a feature map outputted by an $N^{th}$ stage of convolutional neural network in the plurality of stages of convolutional neural networks. Using the face detection model including five stages of convolutional neural networks as an example, if the size parameter is within a first parameter range and a maximum parameter value in the first parameter range is a relatively small value, a feature resolution applicable to a face in a relatively small scale in the small-scale faces corresponding to the face candidate region is a feature resolution of a feature map outputted by the third stage of convolutional neural network; if the size parameter is within a second parameter range, the second parameter range does not overlap with the first parameter range, and a minimum parameter value in the second parameter range is greater than the maximum parameter value in the first parameter range, a feature resolution of a face larger than the previous case (e.g., may be referred to as a middle-scale face) and may corresponds to a feature resolution of a feature map outputted by the fourth stage of convolutional neural network. That is, the larger the face, the higher the convolutional neural network stage may be chosen.

Accordingly, the plurality of small-scale faces in different scales each have a corresponding detection model to implement face detection on the small-scale faces in various scales. For example, the face in a relatively small scale in the foregoing small-scale faces corresponds to a detection model, and for a network structure of the detection model, reference may be made to (a) of FIG. 9; and the face in a relatively large scale, for example, the middle-scale face in the foregoing small-scale faces corresponds to a detection model, and for a network structure of the detection model, reference may be made to (b) of FIG. 9. For detailed description of the network structure of the detection model corresponding to the face in a relatively small scale in the small-scale faces, reference may be made to a description part about FIG. 9 below, and details are not described herein again.

For example, in the embodiments of this disclosure, the small-scale faces may be divided into faces in two scales, where faces in one scale correspond to the first parameter range, for example, the size parameter $$\frac{w_p * h_p}{w_{oi} * h_{oi}}$$

is located within the first parameter range [0, 1/100]; and faces in the other scale may correspond to the second parameter range, for example, the size parameter $$\frac{w_p * h_p}{w_{oi} * h_{oi}}$$

is located within the second parameter range (1/100, 1/10). For description of the size parameter $$\frac{w_p * h_p}{w_{oi} * h_{oi}},$$

reference may be made to the description of related content in step S302, and details are not described herein again.

As can be seen, in the embodiments of this disclosure, a corresponding detection model is determined based on the size parameter of the face candidate region. detection model That is to say, in the embodiments of this disclosure, for the plurality of face candidate regions included in the to-be-detected image, targeted face detection may be performed on the face candidate region by adaptively selecting, according to a size parameter of each face candidate region, a detection model corresponding to the size parameter, thereby improving detection precision for faces in different scales and accurately and effectively detecting faces in various scales. Rather than using a single static detection model for faces of various sizes, the detection model is dynamically chosen based on the face size.

In the embodiments of this disclosure, not only face detection on the small-scale faces may be implemented, but also face detection on large-scale faces may be implemented. Specifically, in an example of the embodiments of this disclosure, when the size parameter is greater than a second proportion condition or a second threshold condition, it may be alternatively determined that the face candidate region corresponds to a large-scale face. In this disclosure, a large-scale or a small-scale face may be determined by its absolute area, or a relative area as a ratio to the to-be-detected image and the determination condition may be pre-defined and adjusted based on practical need.

The second proportion condition is not specifically limited in the embodiments of this disclosure, and the second proportion condition may be determined according to a practical situation.

For example, a case that the size parameter is greater than the second proportion condition may be that, for example, the ratio of the number $w_p*h_p$ of pixels included in the face candidate region to the number $w_{oi}*h_{oi}$ of pixels included in the feature map outputted by the face detection model is greater than $\frac{1}{10}$, that is, $$\frac{w_p*h_p}{w_{oi}*h_{oi}} > \frac{1}{10}.$$

For description of the size parameter $$\frac{w_p*h_p}{w_{oi}*h_{oi}},$$

reference may be made to the description of related content in step S302, and details are not described herein again.

In the embodiments of this disclosure, after determining that the face candidate region corresponds to a large-scale face, face detection may be performed on the face candidate region by using a second detection model corresponding to the large-scale face. During a specific implementation of performing face detection on the face candidate region by using the second detection model, the face detection may be implemented through the following steps A and B.

Step A: Obtain, by using the second detection model, projection features of the face candidate region on feature maps outputted by at least two stages of convolutional neural networks in the face detection model, the at least two stages of convolutional neural networks including a third convolutional neural network, and a feature resolution of a feature map outputted by the third convolutional neural network being corresponding to the size parameter.

Step B: Perform face detection on the face candidate region according to the projection features on the feature maps outputted by the at least two stages of convolutional neural networks.

A case that the feature resolution of the feature map outputted by the third convolutional neural network is corresponding to the size parameter is similar to the foregoing "the feature resolution of the feature map outputted by the first convolutional neural network is applicable to the size parameter", so that for related content, reference may be made to the description part that "the feature resolution of the feature map outputted by the first convolutional neural network is applicable to the size parameter", and details are not described herein again.

The face detection method corresponding to the large-scale face described in step A and step B and the face detection method corresponding to the small-scale face described in steps S301 to S303 have both a similarity and a difference.

The similarity is that, in both of the two methods, face detection is performed by using the projection features on the feature maps outputted by the at least two stages of convolutional neural networks in the face detection model. For the same part (step B) of the two methods, reference may be made to the description of steps S301 to S303, and details are not described herein again.

The difference between the two methods is that, when face detection is performed on the face candidate region corresponding to the small-scale face, since the corresponding size parameter is relatively small, there may be less semantic information carried in the projection feature of the first convolutional neural network. Therefore, the fused feature obtained by fusing the projection feature of the first convolutional neural network and the projection feature of the second convolutional neural network is used as the projection feature of the first convolutional neural network, to remedy a defect that there is not much semantic information carried in the projection feature of the first convolutional neural network. However, when face detection is performed on the face candidate region corresponding to the large-scale face, since the corresponding size parameter is relatively large, the third convolutional neural network is very likely to be a higher stage of convolutional neural network in the plurality of stages of convolutional neural networks included in the face detection model. That is to say, the third convolutional neural network may not only meet the feature resolution requirement for performing recognition on the large-scale face, but also carry more semantic information. Therefore, when face detection is performed on the face candidate region corresponding to the large-scale face, there is no need to process the projection feature of the third convolutional neural network. Instead, face detection is directly performed on the face candidate region according to the projection features on the feature maps outputted by the at least two stages of convolutional neural networks, without the need of the fusion process.

It may be understood that, in an actual application, the to-be-detected image may include a plurality of face candidate regions, and the plurality of face candidate regions may correspond to different face scales. In the conventional face detection method, only one face detection model is included for a plurality of face candidate regions, and face detection is performed on face candidate regions corresponding to faces in various scales by using such one face detection model. However, in the embodiments of this disclosure, the detection model and the second detection model may be included. Therefore, after a face scale corresponding to the face candidate region is determined, a corresponding detection model may be selected to perform face detection, and the detection model and the second detection model may perform parallel detection, thereby improving the efficiency of detecting a face in the to-be-detected image. For example, if the to-be-detected image includes two face candidate regions, where a first face candidate region corresponds to a small-scale face and a second face candidate region corresponds to a large-scale face, face detection may be performed on the first face candidate region by using a detection model, and face detection may be performed on the second face candidate region by using a second detection model, thereby implementing recognition of faces in different scales. In addition, the face detection may be performed at the same time, thereby improving the efficiency of performing face detection on the two face candidate regions.

Considering that, in a process of performing face detection on the face candidate region, the importance of the projection features on the feature maps outputted by the at least two stages of convolutional neural networks differs from each other, if a projection feature with higher importance is increased during face detection, it is more helpful to accurately detect a face in the face candidate region. In view of this, in an implementation of the embodiments of this disclosure, weight coefficients used for representing the importance of the projection features of the convolutional neural networks in face detection are introduced to the projection features of the at least two stages of convolutional neural networks.

It may be understood that, in the projection features used by the detection model to detect the small-scale face, the projection feature of the first convolutional neural network is a fused feature, which not only has a feature resolution more applicable to the size of the small-scale face, but also carries more semantic information compared with projection features of other convolutional neural networks. Therefore, the importance of the projection feature of the first convolutional neural network during detection on the small-scale face may be higher than the importance of the projection features of the other convolutional neural networks.

On the other hand, in the projection features used by the second detection model to detect the large-scale face, the projection feature of the third convolutional neural network both has a feature resolution more applicable to a size of the large-scale face and carries more semantic information. Therefore, the importance of the projection feature of the third convolutional neural network during detection on the large-scale face may be higher than the importance of the projection features of the other convolutional neural networks.

As described above, the feature resolution of the first convolutional neural network is corresponding to a size parameter of the face candidate region corresponding to the small-scale face, and the feature resolution of the third convolutional neural network is corresponding to a size parameter of the face candidate region corresponding to the large-scale face. Therefore, in the embodiments of this disclosure, when weight coefficients are set, a weight coefficient of a convolutional neural network whose feature resolution is corresponding to, or optimized for, the size parameter is greater than weight coefficients of other convolutional neural networks, to represent that the importance of the projection feature of the convolutional neural network whose feature resolution is applicable to the size parameter is the highest. Therefore, in the features for performing face detection on the face candidate region, a proportion of an importance feature is larger, thereby better helping to accurately recognize the face in the face candidate region.

Specifically, for the performing face detection on the face candidate region corresponding to the small-scale face described in steps S301 to S303, a weight coefficient of the projection feature of the first convolutional neural network is higher than a weight coefficient of a projection feature of another convolutional neural network, such as the second convolutional neural network, as the output of the first convolutional neural network is considered to be more important. For the performing face detection on the face candidate region corresponding to the large-scale face described in steps A and B, a weight coefficient of the projection feature of the third convolutional neural network is higher than weight coefficients of projection features of other convolutional neural networks, as the output of the third convolutional neural network is considered to be more important.

Specific values of the weight coefficients respectively corresponding to the projection features of the at least two stages of convolutional neural networks are not specifically limited in the embodiments of this disclosure, and the specific values of the weight coefficients respectively corresponding to the projection features of the at least two stages of convolutional neural networks may be determined according to a practical situation.

After weight coefficients are set for the projection features of the at least two stages of convolutional neural networks, during specific implementation of the "perform face detection on the face candidate region according to the projection features on the feature maps outputted by the at least two stages of convolutional neural networks" described in steps S303 and B, face detection may be performed on the face candidate region according to the projection features on the feature maps outputted by the at least two stages of convolutional neural networks and the respective corresponding weight coefficients.

The embodiments of this disclosure do not specifically limit an implementation of performing face detection on the face candidate region according to the projection features on the feature maps outputted by the at least two stages of convolutional neural networks and the respective corresponding weight coefficients. As an example, the projection features on the feature maps outputted by the at least two stages of convolutional neural networks may be multiplied by the respective corresponding weight coefficients respectively, and then the projection features multiplied by the weight coefficients are used as inputs of the ROI pooling layer, to obtain a corresponding detection result.

The face detection method provided in the embodiments of this disclosure is described above, and the following describes an implementation of step S402 "use a fused feature obtained by fusing a projection feature of the first convolutional neural network and a projection feature of the second convolutional neural network as a projection feature of the first convolutional neural network" with reference to the accompanying drawings.

Figure 5:
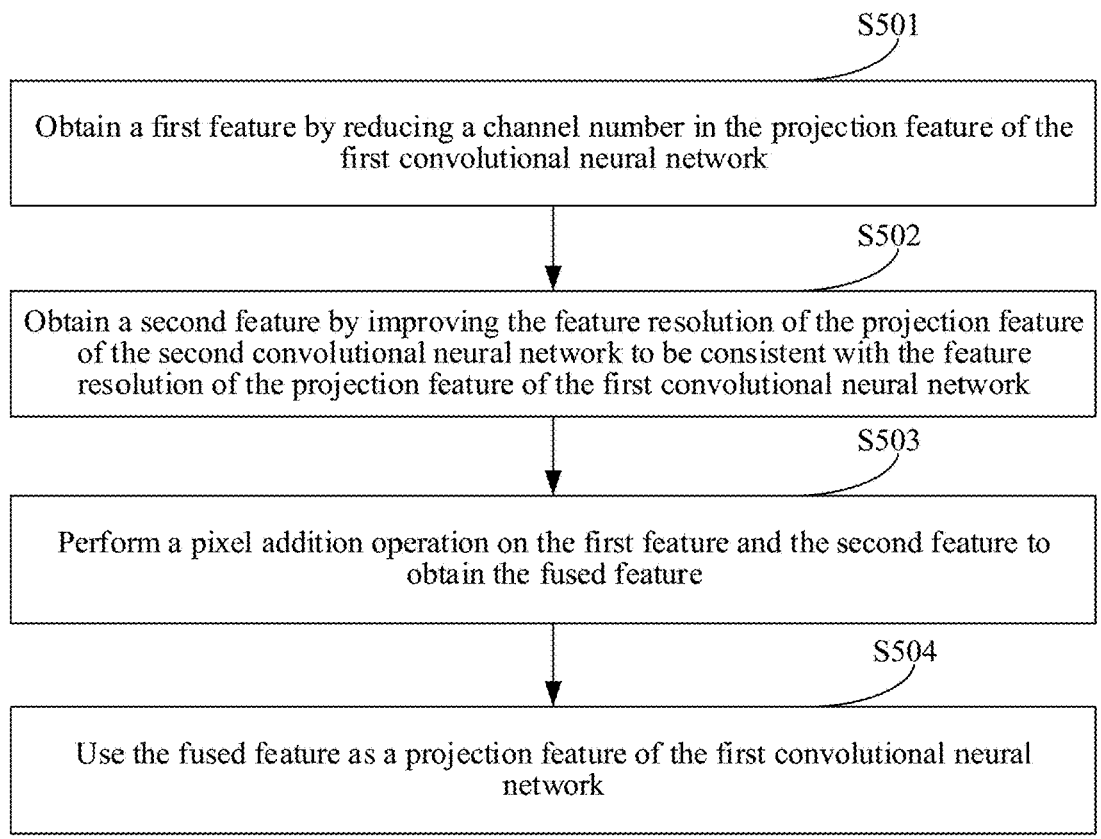
FIG. 5 is a schematic flowchart of a method for determining a projection feature of a first convolutional neural network according to an embodiment of this disclosure.

FIG. 5 is a schematic flowchart of a method for determining a projection feature of a first convolutional neural network according to an embodiment of this disclosure.

The method may be implemented, for example, through the following steps S501 to S504.

Step S501: Obtain a first feature by reducing a channel number in the projection feature of the first convolutional neural network.

Considering that the fused feature carries the semantic information in which the first projection feature is lacking, when the fused feature is used as the projection feature of the first convolutional neural network to perform face recognition on the face candidate region, the computing complexity is accordingly increased. In view of this, in the embodiments of this disclosure, the channel number in the projection feature of the first convolutional neural network may be reduced to obtain a first feature, and then feature fusion is performed on the first feature and the projection feature of the second convolutional neural network, to make the computing complexity of the obtained fused feature greatly reduced compared with that of the fused feature obtained by "directly fusing the projection feature of the first convolutional neural network and the projection feature of the second convolutional neural network".

Step S502: Obtain a second feature by improving the feature resolution of the projection feature of the second convolutional neural network to be consistent with the feature resolution of the projection feature of the first convolutional neural network.

For step S502, the feature resolution of the projection feature of the second convolutional neural network is lower than the feature resolution of the projection feature of the first convolutional neural network, and a feature resolution of the first feature is the same as the feature resolution of the projection feature of the first convolutional neural network. Therefore, the feature resolution of the projection feature of the second convolutional neural network is lower than the feature resolution of the first feature. Feature fusion needs to be performed based on pixels. Therefore, in the embodiments of this disclosure, before the first feature and the projection feature of the second convolutional neural network are fused, the projection feature of the second convolutional neural network needs to be processed, to make a feature resolution corresponding to a feature obtained after processing the same as the feature resolution of the first feature.

In the embodiments of this disclosure, the feature resolution of the projection feature of the second convolutional neural network may be improved to be consistent with the feature resolution of the projection feature of the first convolutional neural network to obtain the second feature. In the embodiments of this disclosure, considering that the first convolutional neural network is in a lower stage compared with the second convolutional neural network, the projection feature of the second convolutional neural network contains less samplings compared with the first convolutional neural network. Therefore, in the embodiments of this disclosure, upsampling processing may be performed on the projection feature of the second convolutional neural network to obtain the second feature whose feature resolution is consistent with the feature resolution of the projection feature of the first convolutional neural network.

Step S503: Perform a pixel addition operation on the first feature and the second feature to obtain the fused feature.

It may be understood that, the feature resolution of the first feature is the same as the feature resolution of the second feature, so that feature fusion may be performed on the first feature and the second feature.

The pixel addition operation mentioned in the embodiments of this disclosure refers to adding features of pixels in the first feature to features of pixels corresponding to the pixels in the second feature.

Step S504: Use the fused feature as a projection feature of the first convolutional neural network.

It may be understood that, the fused feature is obtained by performing the pixel addition operation on the first feature and the second feature, so that each pixel in the fused feature carries both feature information of the first feature and feature information of the second feature. Therefore, the fused feature not only has a higher feature resolution, but also carries more semantic information.

The following describes an implementation of step S301 "determine a face candidate region in a to-be-detected image according to a face detection model" with reference to the accompanying drawings.

The face candidate region may be determined by uniformly generating anchor boxes in the to-be-detected image. The generating an anchor box refers to generating a pixel box including a plurality of pixels by using one pixel in the to-be-detected image as a central point of the anchor box. However, if the number of face candidate regions determined by using the conventional method is relatively large, the number of face candidate regions to be detected by the face detection model during face detection on the to-be-detected image is also relatively large, and consequently the efficiency of face detection performed on the to-be-detected image is relatively low.

Figure 6:
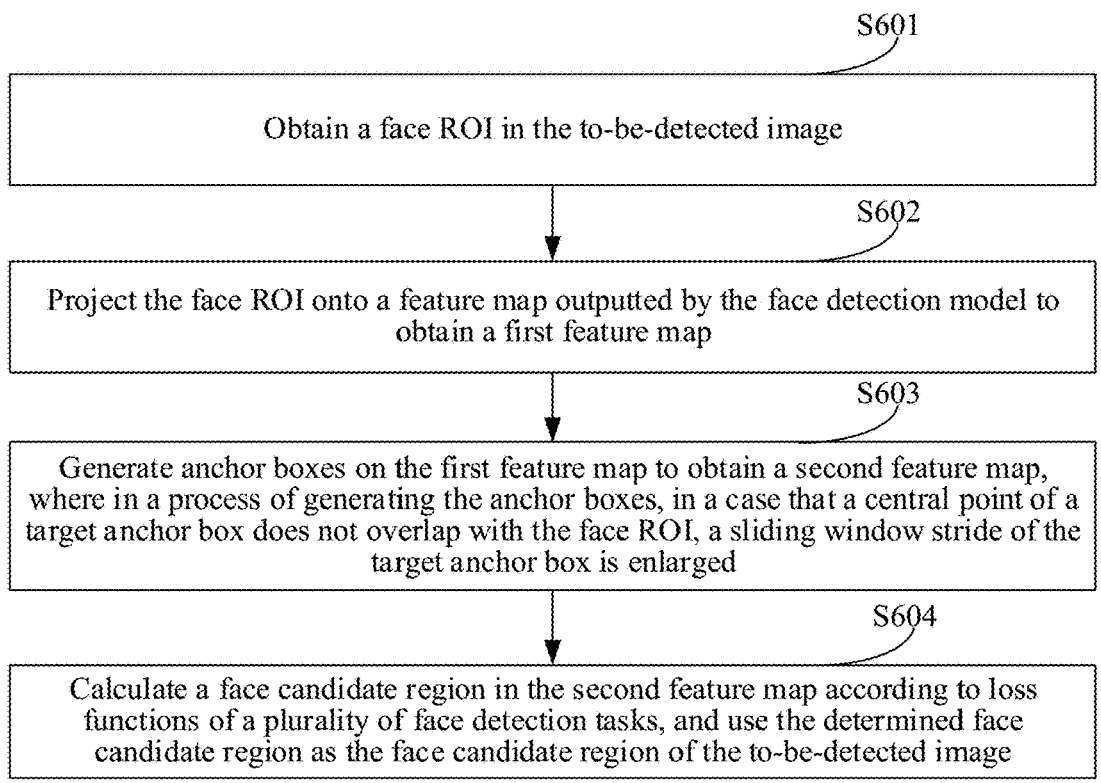
FIG. 6 is a schematic flowchart of a method for determining a face candidate region according to an embodiment of this disclosure.

In view of this, in the embodiments of this disclosure, to reduce the number of determined face candidate regions, thereby improving the efficiency of face detection performed on the to-be-detected image. Specifically, FIG. 6 is a schematic flowchart of a method for determining a face candidate region according to an embodiment of this disclosure.

The method may be implemented, for example, through the following steps S601 to S604.

Step S601: Obtain a face ROI in the to-be-detected image.

The face ROI mentioned herein is a concept relatively similar to the face candidate region and also refers to a region in which a face may be included. In the embodiments of this disclosure, the face ROI may be used for determining a face candidate region. An implementation of obtaining the face ROI is not specifically limited in the embodiments of this disclosure. As an example, the face ROI in the to-be-detected image may be quickly determined and obtained by a face detector based on cascaded Boosting.

Step S602: Project the face ROI onto a feature map outputted by the face detection model to obtain a first feature map.

Step S603: Generate anchor boxes on the first feature map to obtain a second feature map, where in a process of generating the anchor boxes, in a case that a central point of a target anchor box does not overlap with the face ROI, a sliding window step size of the target anchor box is enlarged.

In the embodiments of this disclosure, the feature map outputted by the face detection model may be a feature map outputted by the last stage of convolutional neural network in the plurality of stages of convolutional neural networks included in the face detection model. The first feature map may be understood and represented as an image feature map corresponding to the face ROI in the feature map outputted by the face detection model.

In the embodiments of this disclosure, considering that a probability of the face ROI being the face candidate region is relatively high, when the face candidate region is determined with reference to the face ROI and an image feature extracted by the face detection model, the image feature corresponding to the face ROI may be analyzed with more focus.

In the embodiments of this disclosure, the face candidate region is determined in a manner of generating anchor boxes on the first feature map. Specifically, the probability of the face ROI being the face candidate region is relatively large, so that anchor boxes may be uniformly generated when central points of the anchor boxes overlap with the face ROI. However, a probability of a region other than the face ROI being the face candidate region is relatively small. In view of this, in the embodiments of this disclosure, to reduce the number of determined face candidate regions, when a central point of a target anchor box does not overlap with the face ROI, a sliding window step size of the target anchor box may be enlarged. That is to say, the generated anchor boxes are not uniformly distributed for the entire to-be-detected image. A distribution density of anchor boxes outside the face ROI is lower than a distribution density of anchor boxes inside the face ROI, thereby reducing the number of anchor boxes and accordingly reducing the number of determined face candidate regions. For example, when central points of anchor boxes overlap with the face ROI, the anchor boxes may be uniformly generated with a step size of 1, and in a process of uniformly generating the anchor boxes, if a central point of a target anchor box is located outside the face ROI, a sliding window step size of the target anchor box may be set to 2.

In the embodiments of this disclosure, considering a shape characteristic of a face target, aspect ratios of all anchor boxes may be set to 1:1 and 1:2, and scales of the anchor boxes may be set to three pixel boxes including $128^2$ pixels, $256^2$ pixels, and $512^2$ pixels. Therefore, each position in the face ROI corresponds to six different anchor boxes, thereby helping to accurately determine a face candidate region.

Step S604: Calculate a face candidate region in the second feature map according to loss functions of a plurality of face detection tasks, and use the determined face candidate region as the face candidate region of the to-be-detected image.

In the embodiments of this disclosure, the second feature map may be used as an input of the loss function, to determine a face candidate region and use the determined face candidate region as the face candidate region of the to-be-detected image.

In the embodiments of this disclosure, considering that the precision of the main task is improved when a task with a high correlation is added in a multi-task loss function, the loss function may be obtained through joint training based on the plurality of face detection tasks. The plurality of tasks have a high correlation with each other.

In the embodiments of this disclosure, the plurality of face detection tasks include a classification task for a face target, a position regression task for a face target box, and a position regression task for a facial landmark. The classification task for a face target refers to detecting a face and a non-face. The position regression task for a face target box refers to detecting a position of a face when the face is detected. The position regression task for a facial landmark refers to detecting a key position on a face when the face is detected, where the key position may be, for example, any one or a combination of a nose, an eye, a mouth, and an eyebrow.

It may be understood that, when face detection is performed, whether it is a face or a non-face needs to be first detected; and then a position of the face needs to be detected when the face is detected, that is, a position of a face target box needs to be determined. Therefore, in the embodiments of this disclosure, when the loss function is trained, the classification task for a face target and the position regression task for a face target box may be considered as necessary. However, the position regression task for a facial landmark is not necessary although having a relatively high correlation with face detection.

Therefore, in the embodiments of this disclosure, respective corresponding loss functions may be trained jointly by using the classification task for a face target and the position regression task for a face target box as main tasks and using the position regression task for a facial landmark as an auxiliary task.

In the embodiments of this disclosure, the loss functions obtained through training based on the main tasks and the auxiliary task may be represented by using the following formula (1):

$$\mathop{\mathrm{argmin}}_{w^r,\{w^a\}a\in A} \sum_{i=1}^{N} \log(p(y_i^r|x_i; w^r)) + \qquad (1)$$
$$\sum_{i=1}^{N} R(y_i^r - f(x_i; w^r)) + \frac{1}{2}\sum_{i=1}^{N} \lambda^a \|y_i^a - f(x_i; w^a)\|^2 + \|w\|_2^2$$

the formula (1) is formed through addition of four parts, where a first part $$\mathop{\mathrm{argmin}}_{w^r,\{w^a\}a\in A} \sum_{i=1}^{N} \log(p(y_i^r|x_i; w^r))$$

is a loss function of the classification task for a face target, a second part $\sum_{i=1}^{N} R(y_i^r - f(x_i; w^r))$ is a loss function of the position regression task for a face target box, a third part $\frac{1}{2}\sum_{i=1}^{N}\lambda^a\|y_i^a - f(x_i; w^a)\|^2$ is a loss function of the position regression task for a facial landmark, and a fourth part $\|w_2^2$ is a weight.

The first two parts are similar to a representation manner of a conventional loss function, and therefore are not described in detail herein again. It only needs to be emphasized that r in $y_i^r$ and $w^r$ of the first part and the second part represents a main task.

For the third part $\frac{1}{2}\sum_{i=1}^{N}\lambda^a\|y_i^a - f(x_i; w^a)\|^2$, a superscript a in $y_i^a$ and $w^a$ represents an auxiliary task, that is, the position regression task for the facial landmark. A subscript i represents a label of inputted data, N represents total data, $\lambda^a$ represents an important coefficient of an $a^{th}$ auxiliary task, x represents an input sample, y represents an actual output result corresponding to the input sample, and $f(x_i; w^a)$ represents a model prediction result corresponding to the input sample.

Although the detection precision of the face detection main task may be effectively improved by adding the auxiliary task of facial landmark detection to the face detection main task, the entire model may be hard to be converged due to the addition of the auxiliary task in the loss function, and a model parameter is trapped into local minimum. As a result, an optimal solution may not be obtained. Therefore, the training process provided in the embodiments of this disclosure may improve the accuracy of face detection through facial landmark detection while ensuring good convergence of the model.

In the embodiments of this disclosure, the face detection model is obtained through training. In a process of training the face detection model in the present disclosure, the model is finely adjusted by using the stochastic gradient descent (SGD) method 60 k times, where an initial learning rate is set to 0.001, and the learning rate is decreased to 0.0001 after 20 k times of iterations. In addition, momentum and weight decay are respectively set to 0.9 and 0.0005, and a size of mini-batch is set to 128.

To improve a detection effect of the face detection model for large-scale faces and small-scale faces, in the process of training the face detection model, hard example mining and data augmentation operations are performed to implement augmentation of training samples, thereby increasing a speed of obtaining the face detection model through training.

In the embodiments of this disclosure, the hard example mining refers to sorting all negative samples through the highest confidence score, and only selecting negative samples with the highest score, to make a ratio of positive samples to negative samples be 1:3 by continuously iterating the process. The hard example mining method may increase the speed of network optimization and make a network training process more stable.

In the embodiments of this disclosure, the data augmentation processing may include the following three situations.

(1) Perform a flipping operation on an original image.

(2) Randomly sample a sample fragment, where a random scale of each sample is set to a value within [0.5, 1] of the original image, and an aspect ratio relationship of a rectangular box is set to a value within [0.5, 2] of the original image, to generate a new training sample.

(3) Perform a cropping operation on the original image randomly.

The face detection method provided in the embodiments of this disclosure is described above, and the face detection method described in the foregoing embodiments is described below with reference to a specific scenario.

Figure 7:
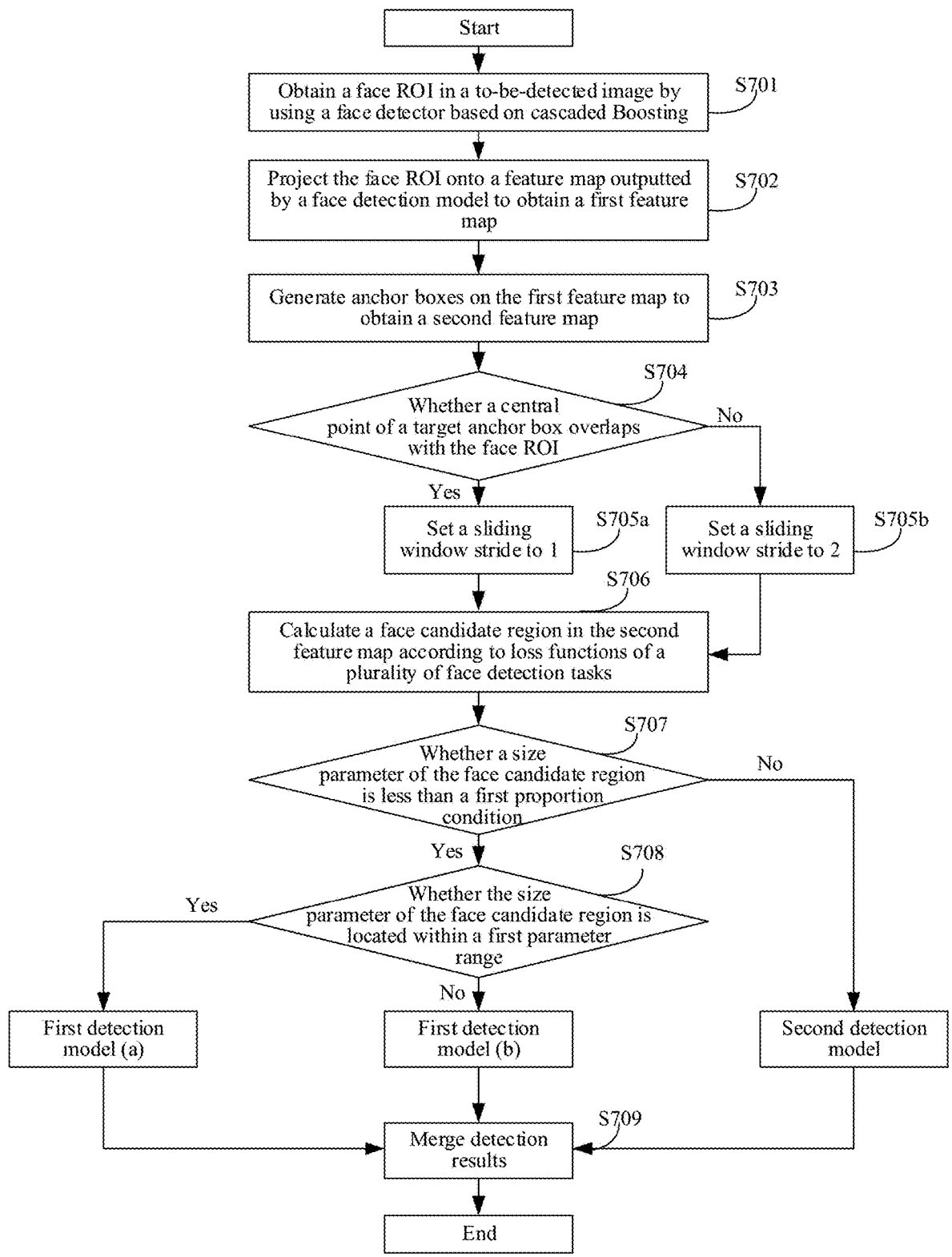
FIG. 7 is a schematic diagram of an exemplary application scenario according to an embodiment of this disclosure.

FIG. 7 is a schematic diagram of an application scenario according to an embodiment of this disclosure. In the scenario shown in FIG. 7, two detection models are included and are a detection model (a) and a detection model (b) respectively. A size parameter within a size range to which the detection model (a) is applicable is less than a size parameter within a size range to which the detection model (b) is applicable.

The method shown in FIG. 7 may be implemented through the following steps S701 to S709.

Step S701: Obtain a face ROI in a to-be-detected image by using a face detector based on cascaded Boosting.

Step S702: Project the face ROI onto a feature map outputted by a face detection model to obtain a first feature map.

Step S703: Generate anchor boxes on the first feature map to obtain a second feature map.

Step S704: Determine whether a central point of a target anchor box overlaps with the face ROI. Step S705a is performed if the central point of the target anchor box overlaps with the face ROI; otherwise, step S705b is performed.

Step S705a: Set a sliding window step size to 1.

Step S705b: Set a sliding window step size to 2.

Step S706: Calculate a face candidate region in the second feature map according to loss functions of a plurality of face detection tasks.

Step S707: Determine whether a size parameter of the face candidate region is less than a first proportion condition.

If the size parameter of the face candidate region is less than the first proportion condition, step S708 is performed; and if the size parameter of the face candidate region is greater than the first proportion condition, it may be determined that the face candidate region corresponds to a large-scale face, and face detection may be performed on the face candidate region by using a second detection model.

Step S708: Determine whether the size parameter of the face candidate region is located within a first parameter range.

If the size parameter of the face candidate region is located within the first parameter range, it is determined that the face candidate region corresponds to a face in a relatively small scale in the small-scale faces, and face detection is performed on the face candidate region by using the detection model (a).

If the size parameter of the face candidate region is not located within the first parameter range, it is determined that the face candidate region corresponds to a face in a relatively large scale in the small-scale faces, and face detection is performed on the face candidate region by using the detection model (b).

Step S709: Merge detection results.

Detection results of the detection model (a), the detection model (b), and the second detection model are merged to implement detection of faces in various scales in the to-be-detected image.

In addition, the detection model (a), the detection model (b), and the second detection model may perform parallel processing. That is to say, face detection may be performed on three face candidate regions simultaneously, thereby improving the efficiency of performing face recognition on the to-be-detected image.

The method shown in FIG. 7 is described below with reference to a face detection model shown in FIG. 8.

Figure 8:
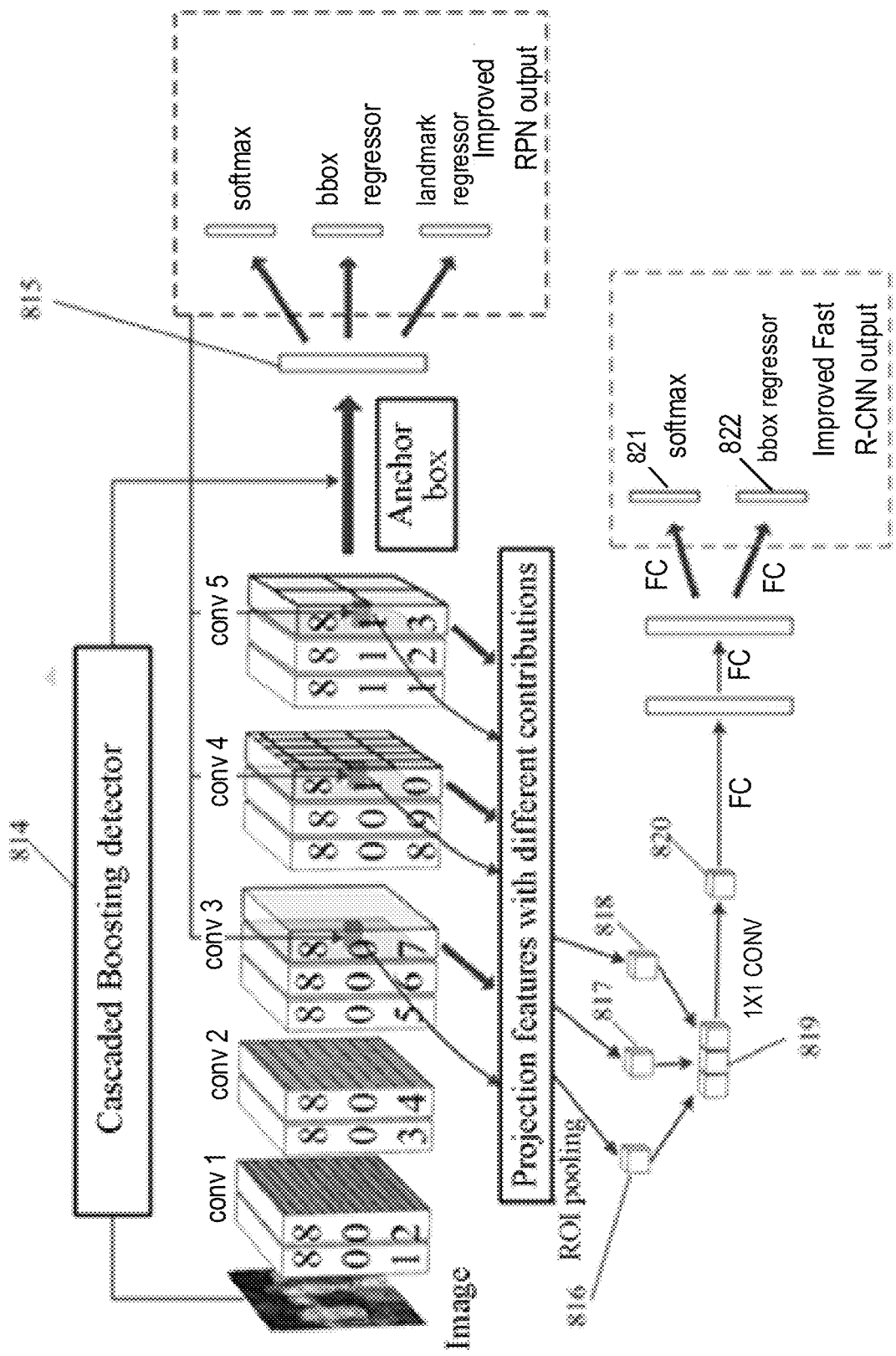
FIG. 8 is a schematic structural diagram of an exemplary face detection model according to an embodiment of this disclosure.

FIG. 8 is a schematic structural diagram of a face detection model according to an embodiment of this disclosure.

The face detection model shown in FIG. 8 uses a network structure similar to that of VGG16, and includes five stages of convolutional neural networks, which are conv1, conv2, conv3, conv4, and conv5 respectively. The conv1 includes two convolutional layers which are 801 and 802 respectively; the conv2 includes two convolutional layers which are 803 and 804 respectively; and the conv3, conv4, and conv5 each include three convolutional layers, which are 805 to 813 shown in FIG. 8.

As shown in FIG. 8, a face ROI may be obtained by using a cascaded Boosting detector 814, and the face ROI is then projected onto a feature map outputted by the convolutional layer 813 to obtain a first feature map (not shown in FIG. 8); and anchor boxes are generated on the first feature map to obtain a second feature map (not shown in FIG. 8), and the second feature map is used as an input of a loss function layer 815 to obtain a face candidate region. Loss functions of the loss function layer 815 include a loss function softmax of a classification task for a face target, a loss function bbox regressor of a position regression task for a face target box, and a loss function landmark regressor of a position regression task for a facial landmark.

In the scenario shown in FIG. 8, face detection is performed on the face candidate region by using projection features of three stages of convolutional neural networks, and specifically, face detection is performed on the face candidate region by using projection features of the conv3, conv4, and conv5. A projection feature 816 of the conv3, a projection feature 817 of the conv4, and a projection feature 818 of the conv5 are inputted into an ROI pooling layer, the ROI pooling layer processes the projection features 816, 817, and 818 to obtain a feature 819, then normalization processing is performed on the feature 819 to obtain a feature 820, and finally the feature 820 is inputted into two fully connected layers (briefly referred to as FC layers) to obtain a face detection result. The detection result includes: whether the face target is a face (corresponding to a classification result 821 of the classification task for a face target in FIG. 8) and a position of the face box (corresponding to a result 822 of the position regression task for a face target box in FIG. 8).

For ease of description, the "face in a relatively small scale in the small-scale faces" described in step S709 is referred to as a small-scale face, and the "face in a relatively large scale in the small-scale faces" described in step S709 is referred to as a middle-scale face. A method for detecting the faces in three scales by using the projection features of the convolutional neural networks conv3, conv4, and conv5 is described below with reference to FIG. 9.

Figure 9:
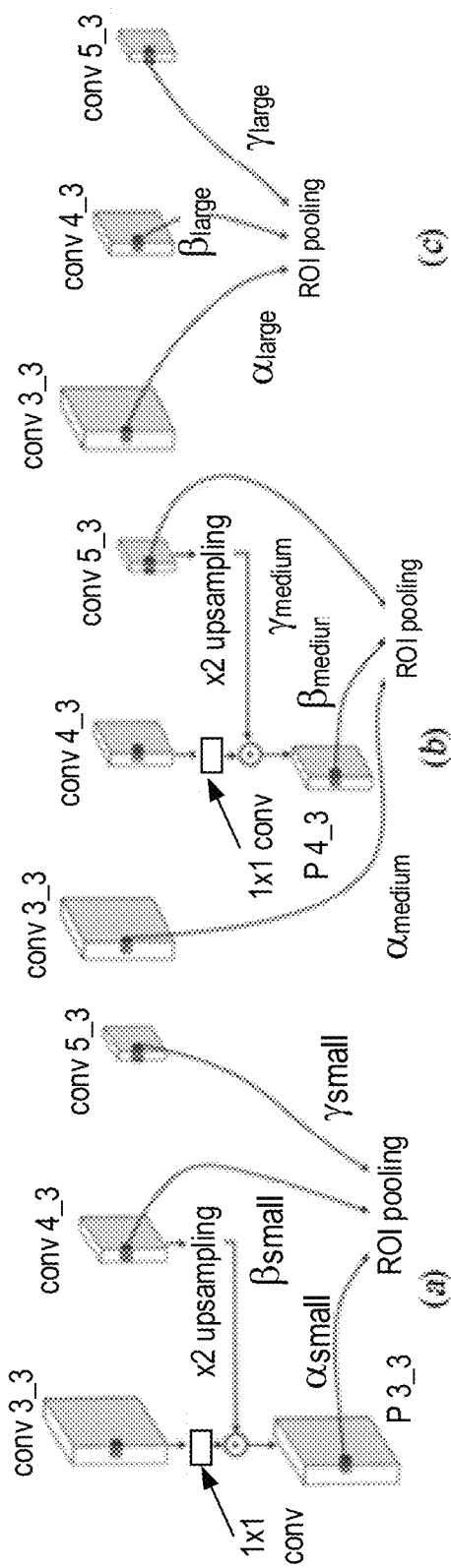
FIG. 9 is a schematic structural diagram of an exemplary detection model according to an embodiment of this disclosure.

FIG. 9 is a schematic structural diagram of a detection model according to an embodiment of this disclosure.

In FIG. 9, (a) shows a schematic diagram of recognizing the small-scale face by using the projection features of the conv3, conv4, and conv5.

Specifically, the conv3 is a first convolutional neural network, and the conv4 is a second convolutional neural network. Channel reduction processing is performed on a projection feature of conv3_3 by using a 1×1 convolutional layer (1×1 cony shown in (a)). Two convolutional layers being respectively conv4_1 and conv4_2 (808 and 809 shown in FIG. 8) are included between conv4_3 and conv3_3, so that two times of downsampling are performed from the projection feature of the conv3_3 to a projection feature of the conv4_3. To make a feature resolution of the projection feature of the conv4_3 the same as a feature resolution of the projection feature of the conv3_3, two times of upsampling processing (×2 upsampling shown in (a)) are performed on the projection feature of the conv4_3. Pixel addition is then performed to the feature obtained through channel reduction processing and the feature obtained through upsampling processing to obtain a fused feature, and the fused feature is used as the projection feature of the first convolutional neural network conv3. Detection is then performed on the small-scale face based on the projection features of the conv3, conv4, and conv5 and respective corresponding weight coefficients $\alpha_{small}$, $\beta_{small}$, and $\gamma_{small}$. The conv3_3 represents a third convolutional layer of the conv3, that is, the convolutional layer 807 shown in FIG. 8, conv4_3 represents a third convolutional layer of the conv4, that is, the convolutional layer 810 shown in FIG. 8, and conv5_3 represents a third convolutional layer of the conv5, that is, the convolutional layer 813 shown in FIG. 8.

A principle of (b) shown in FIG. 9 is similar to that of (a), and therefore details are not described herein again. The difference between the two principles is represented as two points.

First, (b) is used for detecting a middle-scale face, so that a convolutional neural network matching a size parameter of the middle-scale face is the conv4. Therefore, in (b), the conv4 is a first convolutional neural network, and the conv5 is a second convolutional neural network.

Second, among the weight coefficients $\alpha_{small}$, $\beta_{small}$, and $\gamma_{small}$ in (a), the weight coefficient $\alpha_{small}$ corresponding to the conv3 is the largest since a feature resolution corresponding to the conv3 is applicable to a size parameter of the small-scale face; and since a feature resolution corresponding to the conv4 is applicable to the size parameter of the middle-scale face, among the weight coefficients $\alpha_{small}$, $\beta_{small}$, and $\gamma_{small}$ shown in (b), the weight coefficient $\beta_{small}$ corresponding to the conv4 is the largest.

For (c) shown in FIG. 9, fusion processing does not need to be performed when performing face recognition on a large-scale face, and detection is performed on the large-scale face by directly using the projection features of the conv3, conv4, and conv5 and the respective corresponding weight coefficients $\alpha_{small}$, $\beta_{small}$, and $\gamma_{small}$. It may be understood that, since the feature resolution corresponding to the conv3 is applicable to the size parameter of the small-scale face and the feature resolution corresponding to the conv4 is corresponding to the size parameter of the middle-scale face, both the conv3 and the conv4 may meet a feature resolution requirement for performing face detection on the large-scale face. Even the conv5 is also applicable to a size parameter of the large-scale face. Specific values of the weight coefficients $\alpha_{small}$, $\beta_{small}$, and $\gamma_{small}$ in (c) may be determined according to an actual situation. For example, if the conv5 may be applicable to the size parameter of the large-scale face, the weight coefficient $\gamma_{small}$ corresponding to the conv5 may be set to the largest. If the conv5 may not be applicable to the size parameter of the large-scale face, compared with the conv3, the projection feature of the conv4 carries more semantic information, so that the weight coefficient $\beta_{small}$ corresponding to the conv4 may be set to the largest to make a detected face more accurate.

Figure 10A:
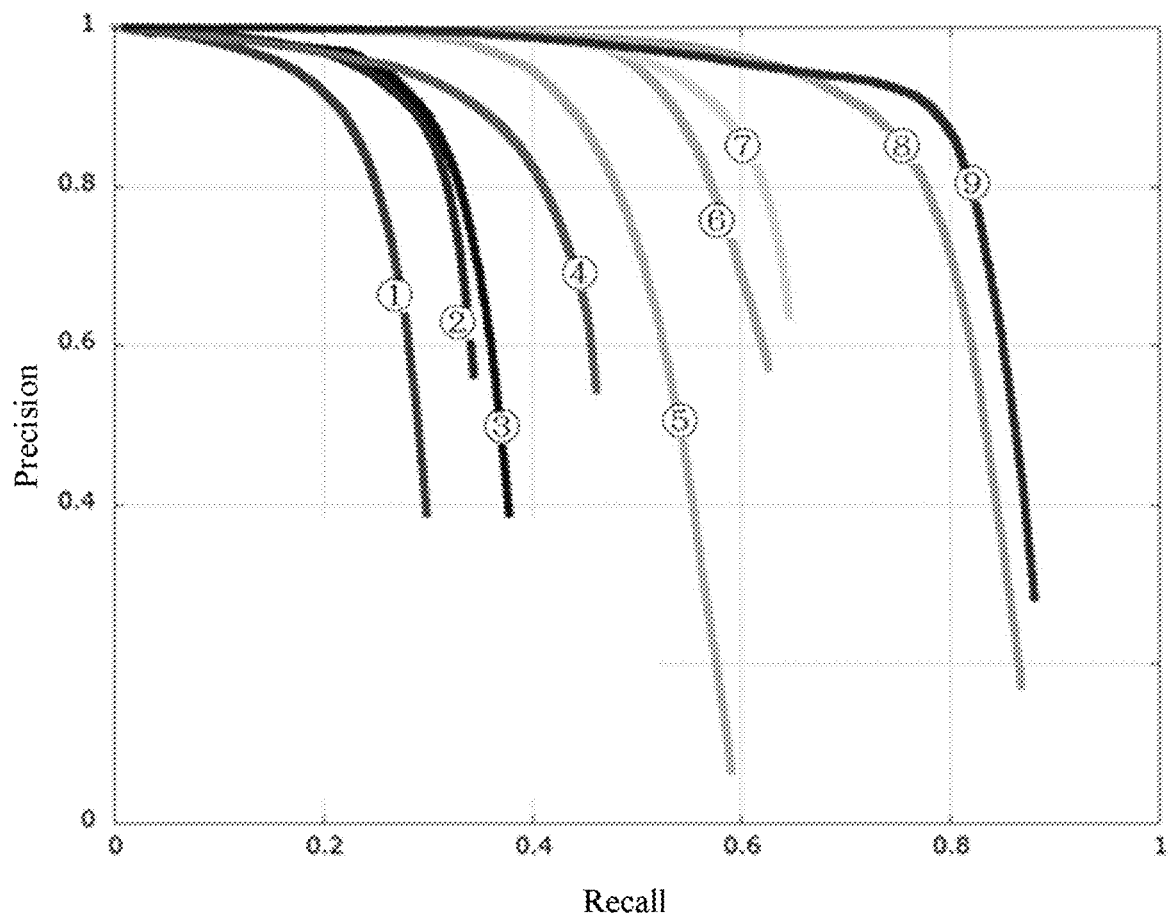
FIG. 10a is a curve chart of precision-recall according to an embodiment of this disclosure.

A detection effect of a face detection method provided in the embodiments of this disclosure is described below with reference to specific detection data. Referring to FIG. 10*a*, FIG. 10*a* shows a curve chart of precision-recall obtained by performing face detection on a validation set used in a training process of a face detection model by using the face detection method provided in the embodiments of this disclosure and the conventional face detection methods.

The validation set may include a plurality of images, and the plurality of images may be, for example, images including faces in different scales. The plurality of images in the validation set may be used for detecting a face detection effect of the face detection model in an iteration process of training.

A curve ① in FIG. 10*a* is a precision-recall curve obtained by performing face detection on the validation set by using an ACF-WIDER face detection method.

A curve ② in FIG. 10*a* is a precision-recall curve obtained by performing face detection on the validation set by using a Two-stage-CNN face detection method.

A curve ③ in FIG. 10*a* is a precision-recall curve obtained by performing face detection on the validation set by using a Faceness-WIDER face detection method.

A curve ④ in FIG. 10*a* is a precision-recall curve obtained by performing face detection on the validation set by using a Multiscale Cascade CNN face detection method.

A curve ⑤ in FIG. 10*a* is a precision-recall curve obtained by performing face detection on the validation set by using an LDCF+ face detection method.

A curve ⑥ in FIG. 10*a* is a precision-recall curve obtained by performing face detection on the validation set by using a Multitask Cascade CNN face detection method.

A curve ⑦ in FIG. 10*a* is a precision-recall curve obtained by performing face detection on the validation set by using a CMS-RCNN face detection method.

A curve ⑧ in FIG. 10*a* is a precision-recall curve obtained by performing face detection on the validation set by using an HR face detection method.

A curve ⑨ in FIG. 10*a* is a precision-recall curve obtained by performing face detection on the validation set by using the face detection method provided in the embodiments of this disclosure.

It can be seen from FIG. 10*a* that, when the recall is the same, the face detection precision of the face detection method provided in the embodiments of this disclosure is higher; and when the detection precision is the same, the recall of the face detection method provided in the embodiments of this disclosure is higher. That is to say, regardless of the detection precision or the recall, the face detection method provided in the embodiments of this disclosure has a better effect than the conventional face detection methods. In other words, both the detection precision and the recall of the face detection model of the embodiments of this disclosure are relatively high in the iteration process.

Figure 10B:
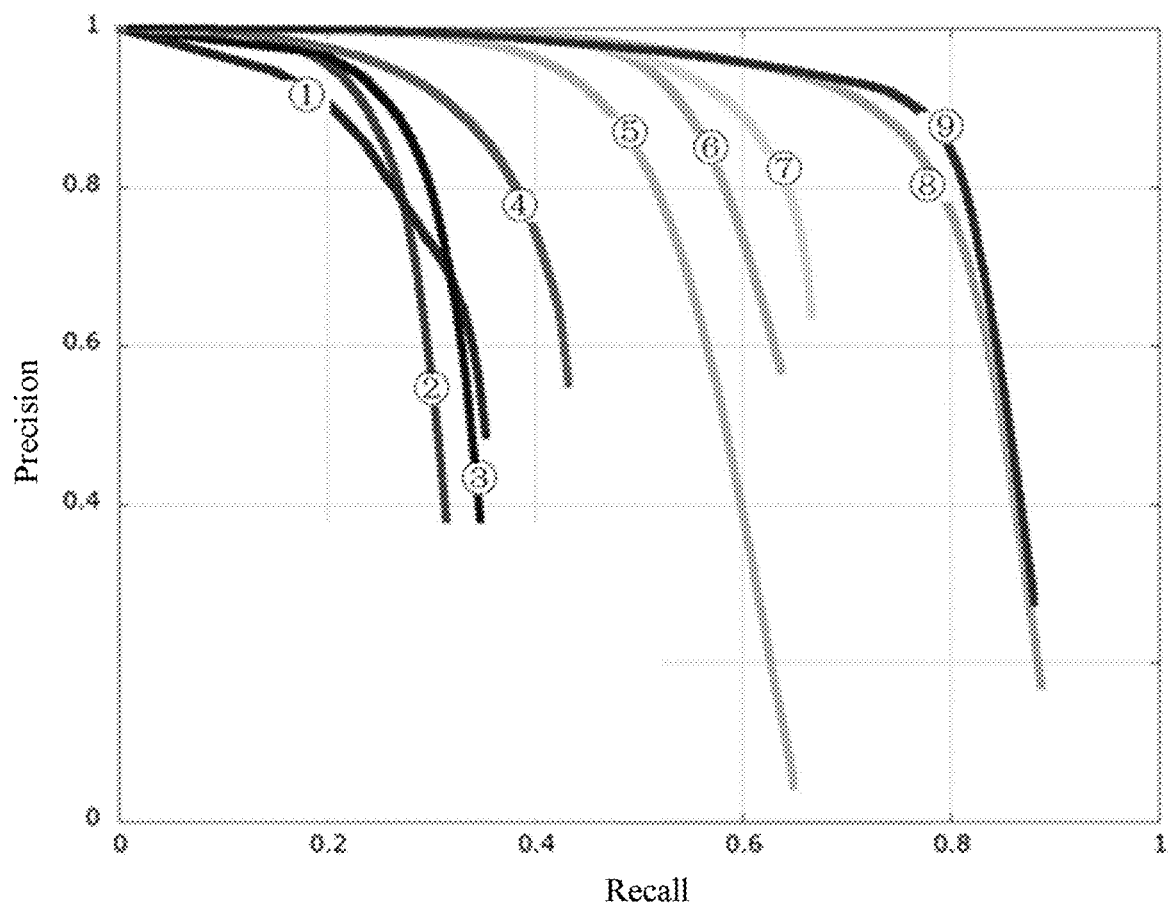
FIG. 10b is another curve chart of precision-recall according to an embodiment of this disclosure.

Referring to FIG. 10*b*, FIG. 10*b* shows a curve chart of precision-recall obtained by performing face detection on a test set used in a training process of a face detection model by using the face detection method provided in the embodiments of this disclosure and the conventional face detection methods.

The test set may include a plurality of images, and the plurality of images may be, for example, images including faces in different scales. The plurality of images may be used for detecting a face detection effect of a face detection model obtained through training.

A curve ① in FIG. 10b is a precision-recall curve obtained by performing face detection on the test set by using the ACF-WIDER face detection method.

A curve ② in FIG. 10b is a precision-recall curve obtained by performing face detection on the test set by using the Two-stage-CNN face detection method.

A curve ③ in FIG. 10b is a precision-recall curve obtained by performing face detection on the test set by using the Faceness-WIDER face detection method.

A curve ④ in FIG. 10b is a precision-recall curve obtained by performing face detection on the test set by using the Multiscale Cascade CNN face detection method.

A curve ⑤ in FIG. 10b is a precision-recall curve obtained by performing face detection on the test set by using the LDCF+ face detection method.

A curve ⑥ in FIG. 10b is a precision-recall curve obtained by performing face detection on the test set by using the Multitask Cascade CNN face detection method.

A curve ⑦ in FIG. 10b is a precision-recall curve obtained by performing face detection on the test set by using the CMS-RCNN face detection method.

A curve ⑧ in FIG. 10b is a precision-recall curve obtained by performing face detection on the test set by using the HR face detection method.

A curve ⑨ in FIG. 10b is a precision-recall curve obtained by performing face detection on the test set by using the face detection method provided in the embodiments of this disclosure.

It can be seen from FIG. 10b that, when the recall is the same, the face detection precision of the face detection method provided in the embodiments of this disclosure is higher; and when the detection precision is the same, the recall of the face detection method provided in the embodiments of this disclosure is higher. That is to say, regardless of the detection precision or the recall, the face detection method provided in the embodiments of this disclosure has a better effect than the conventional face detection methods. In other words, both the precision and the recall of performing face detection on the to-be-detected image by using the face detection model obtained through training in the embodiments of this disclosure are relatively high.

It can be seen with reference to FIG. 10a and FIG. 10b that, when face recognition is performed by using the face detection model provided in the embodiments of this disclosure, regardless of being in the iteration process of training the face detection model or in use of the face detection model obtained through training, the face detection method provided in the embodiments of this disclosure has relatively high precision and relatively high recall compared with the conventional face detection methods.

It may be understood that, both the validation set and the test set mentioned above are image sets including a plurality of images. The images in the validation set (or the test set) may be images including faces in a plurality of scales, and the faces in various scales in the image including faces in a plurality of scales may be effectively detected by using the face detection method provided in the embodiments of this disclosure. This may be understood with reference to FIG. 11.

Figure 11:
FIG. 11 is a schematic diagram of a detection effect of a face detection method according to an embodiment of this disclosure.

FIG. 11 shows a detection effect of a face detection method according to an embodiment of this disclosure, and a small box in FIG. 11 represents a recognized face. It can be seen from FIG. 11 that, faces in various scales may be detected by using the face detection method provided in the embodiments of this disclosure. For example, both small-scale faces near stairs and large-scale faces on sofas in an image in the top-left corner of FIG. 11 can be accurately detected.

Based on the face detection method provided in the foregoing embodiments, the following describes another face detection method according to an embodiment of this disclosure from an overall perspective.

Figure 12:
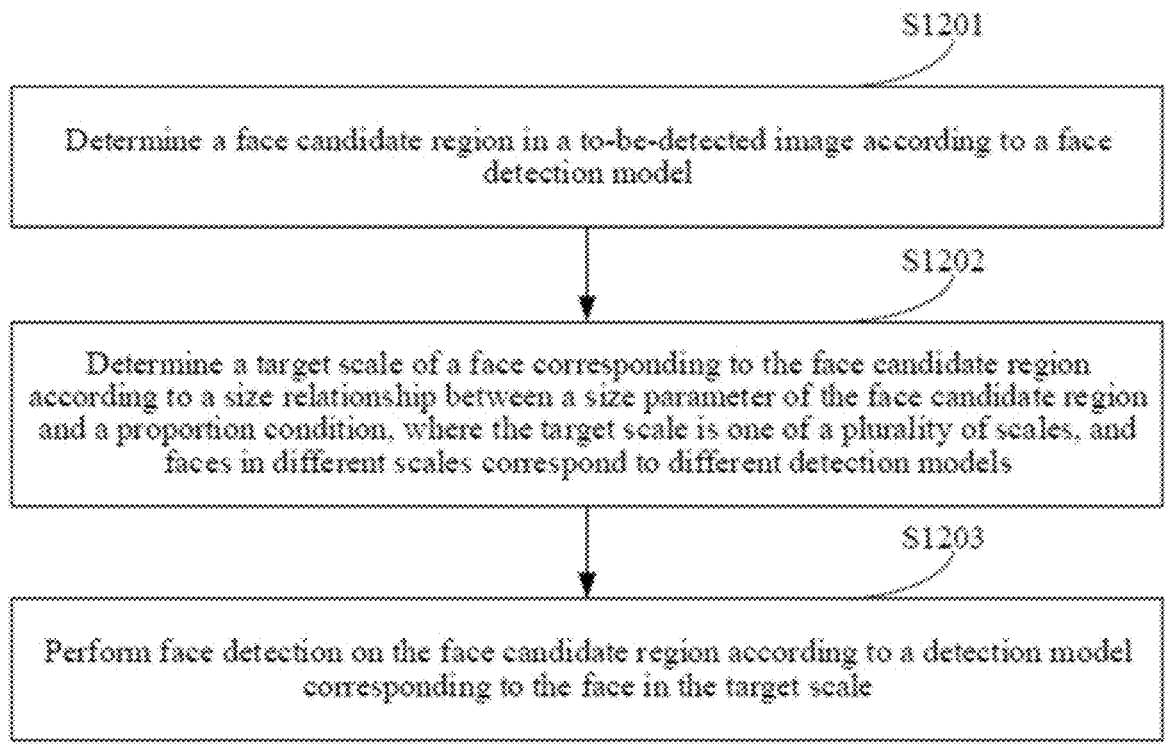
FIG. 12 is a schematic flowchart of an exemplary face detection method according to an embodiment of this disclosure.

FIG. 12 is a schematic flowchart of another face detection method according to an embodiment of this disclosure. The method may be implemented, for example, through the following steps S1201 to S1203.

Step S1201: Determine a face candidate region in a to-be-detected image according to a face detection model.

The face detection model mentioned herein may be the same as the face detection model mentioned in step S301 of the foregoing embodiment, and the face detection model may include a plurality of stages of convolutional neural networks. For an implementation of determining a face candidate region in a to-be-detected image according to a face detection model, which is the same as "determine a face candidate region in a to-be-detected image according to a face detection model" in step S301 of the foregoing embodiment, reference may be made to the description of related content in step S301 of the foregoing embodiment, and details are not described herein again.

Step S1202: Determine a target scale of a face corresponding to the face candidate region according to a size relationship between a size parameter of the face candidate region and a proportion condition, where the target scale is in a set of scales, and faces in different scales correspond to different detection models.

Step S1203: Perform face detection on the face candidate region according to a detection model corresponding to the face in the target scale.

The face detection method provided in the embodiments of this disclosure may detect faces in a set of scales in the to-be-detected image. In the embodiments of this disclosure, considering that a size parameter of the face candidate region may represent a size parameter of a face included in the face candidate region to some extent, the target scale of the face corresponding to the face candidate region may be determined according to the size relationship between the size parameter of the face candidate region and the proportion condition. The proportion condition may e, for example, a ratio between the area of face candidate region and the area of the to-be-detected image.

In the embodiments of this disclosure, the target scale may be, for example, a small scale or a large scale. Specifically, in the embodiments of this disclosure, if the size parameter of the face candidate region is less than or equal to a first proportion condition, it is determined that the target scale of the face corresponding to the face candidate region is a small scale; and if the size parameter of the face candidate region is greater than a second proportion condition, it is determined that the target scale of the face corresponding to the face candidate region is a large scale.

For description of the size parameter of the face candidate region and the first proportion condition, reference may be made to the description part about the size parameter in step S301 of the foregoing embodiment, and details are not described herein again. For the second proportion condition, reference may be made to the description about the second proportion condition in the foregoing embodiment, and details are not described herein again.

In the embodiments of this disclosure, a plurality of face detection models are included and are configured to detect faces in various scales respectively. Therefore, after determining the target scale of the face corresponding to the face candidate region, face detection may be performed on the face candidate region by using a detection model corresponding to the face in the target scale.

In the embodiments of this disclosure, if the target scale of the face corresponding to the face candidate region is a small scale, the face candidate region may be detected by using the detection model mentioned in the foregoing embodiment. For a specific implementation of detecting a small-scale face by using the detection model, reference may be made to the description part of the foregoing embodiment, and details are not described herein again.

In the embodiments of this disclosure, if the target scale of the face corresponding to the face candidate region is a large scale, the face candidate region may be detected by using the second detection model mentioned in the foregoing embodiment. For a specific implementation of detecting a large-scale face by using the second detection model, reference may be made to the description part of the foregoing embodiment, and details are not described herein again.

The small-scale faces may be further subdivided into a plurality of small-scale faces in different scales. The plurality of small-scale faces in different scales each have a corresponding first face detection model to implement face detection on the small-scale faces in various scales.

It may be understood that, the to-be-detected image may include a plurality of face candidate regions, and for any face candidate region, face detection may be performed on the face candidate region by performing the method of steps S1202 and S1203. In the embodiments of this disclosure, if the to-be-detected image includes a plurality of face candidate regions, face detection may be performed on the plurality of face candidate regions by using the method of steps S1202 and S1203 respectively, and then a plurality of face detection results of the plurality of face candidate regions are obtained respectively; and the plurality of face detection results are merged to obtain a face detection result including faces in various scales in the to-be-detected image. The detection on multiple face candidate regions may be performed in parallel to increase efficiency.

As can be seen, after the scale of the face corresponding to the face candidate region is determined by using the face detection method provided in the embodiments of this disclosure, a corresponding detection model may be selected to perform face detection, to recognize faces in different scales.

Figure 13A:
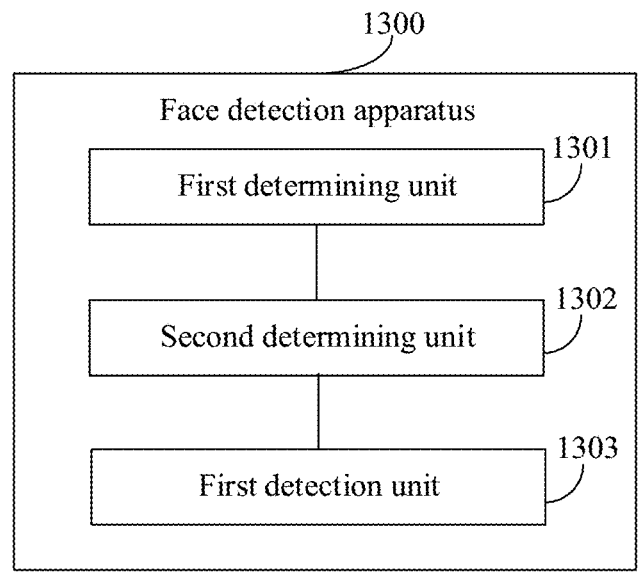
FIG. 13a is a schematic structural diagram of a face detection apparatus according to an embodiment of this disclosure.

Based on the face detection method provided in the embodiment corresponding to FIG. 2 to FIG. 9, an embodiment provides a face detection apparatus 1300. Referring to FIG. 13*a*, the apparatus 1300 includes: a first determining unit 1301, a second determining unit 1302, and a first detection unit 1303.

The first determining unit 1301 is configured to determine a face candidate region in a to-be-detected image according to a face detection model, where the face detection model includes a plurality of stages of convolutional neural networks.

The second determining unit 1302 is configured to determine that the face candidate region corresponds to a small-scale face in a case that a size parameter of the face candidate region is less than a first proportion condition.

The first detection unit 1303 is configured to perform face detection on the face candidate region by using a detection model corresponding to the small-scale face, where the performing face detection includes:

obtaining, by using the detection model, projection features of the face candidate region on feature maps outputted by at least two stages of convolutional neural networks in the face detection model, the at least two stages of convolutional neural networks including a first convolutional neural network and a second convolutional neural network, a feature resolution of a feature map outputted by the first convolutional neural network being applicable to the size parameter, an adjacent-stage convolutional neural network of the first convolutional neural network being the second convolutional neural network, and a feature resolution of a feature map outputted by the second convolutional neural network being lower than the feature resolution of the feature map outputted by the first convolutional neural network;

using a fused feature obtained by fusing a projection feature of the first convolutional neural network and a projection feature of the second convolutional neural network as a projection feature of the first convolutional neural network; and performing face detection on the face candidate region according to the projection features on the feature maps outputted by the at least two stages of convolutional neural networks.

Figure 13B:
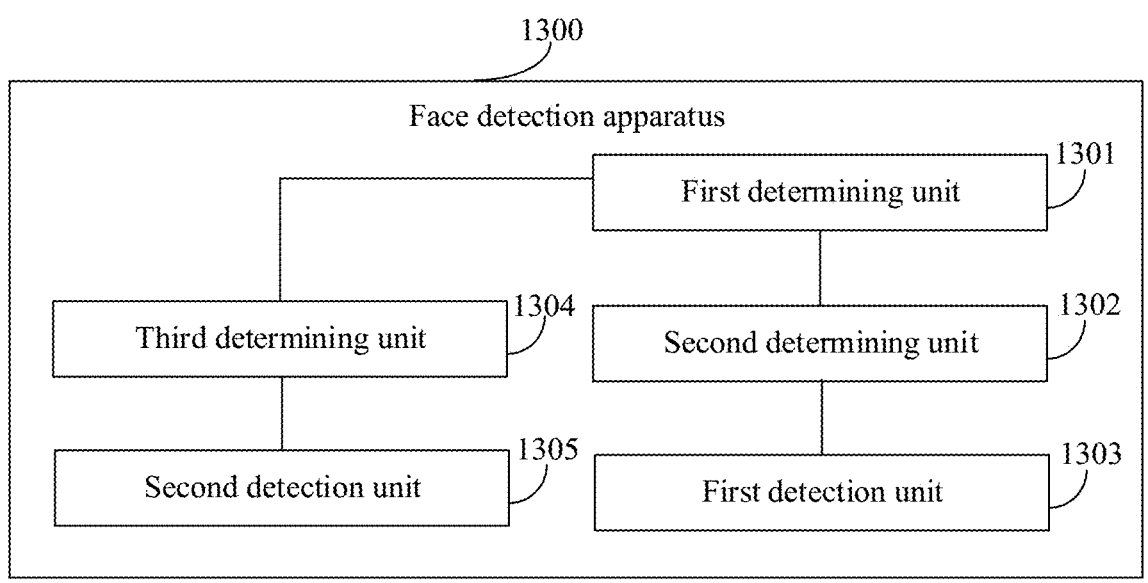
FIG. 13b is another schematic structural diagram of a face detection apparatus according to an embodiment of this disclosure.

In an implementation, if the size parameter of the face candidate region is greater than a second proportion condition, referring to FIG. 13*b*, the apparatus 1300 further includes: a third determining unit 1304 and a second detection unit 1305.

The third determining unit 1304 is configured to determine that the face candidate region corresponds to a large-scale face.

The second detection unit 1305 is configured to perform face detection on the face candidate region by using a second detection model corresponding to the large-scale face, where the performing face detection includes:

obtaining, by using the second detection model, projection features of the face candidate region on feature maps outputted by at least two stages of convolutional neural networks in the face detection model, the at least two stages of convolutional neural networks including a third convolutional neural network, and a feature resolution of a feature map outputted by the third convolutional neural network being applicable to the size parameter; and performing face detection on the face candidate region according to the projection features on the feature maps outputted by the at least two stages of convolutional neural networks.

In an implementation, weight coefficients are respectively set for the at least two stages of convolutional neural networks, and in the at least two stages of convolutional neural networks, a weight coefficient of a convolutional neural network whose feature resolution is applicable to the size parameter is greater than a weight coefficient of another convolutional neural network; and the performing face detection on the face candidate region according to the projection features on the feature maps outputted by the at least two stages of convolutional neural networks includes:

performing face detection on the face candidate region according to the projection features on the feature maps outputted by the at least two stages of convolutional neural networks and the respective corresponding weight coefficients.

In an implementation, the using a fused feature obtained by fusing a projection feature of the first convolutional neural network and a projection feature of the second convolutional neural network as a projection feature of the first convolutional neural network includes:

obtaining a first feature by reducing a channel number in the projection feature of the first convolutional neural network;

obtaining a second feature by improving the feature resolution of the projection feature of the second convolutional neural network to be consistent with the feature resolution of the projection feature of the first convolutional neural network;

performing a pixel addition operation on the first feature and the second feature to obtain the fused feature; and using the fused feature as the projection feature of the first convolutional neural network.

In an implementation, the first determining unit 1301 is specifically configured to:

obtain a face ROI in the to-be-detected image;

project the face ROI onto a feature map outputted by the face detection model to obtain a first feature map;

generate anchor boxes on the first feature map to obtain a second feature map, in a process of generating the anchor boxes, in a case that a central point of a target anchor box does not overlap with the face ROI, a sliding window step size of the target anchor box being enlarged; and calculate a face candidate region in the second feature map according to loss functions of a plurality of face detection tasks, and use the determined face candidate region as the face candidate region of the to-be-detected image.

In an implementation, the plurality of face detection tasks include a classification task for a face target, a position regression task for a face target box, and a position regression task for a facial landmark, and the loss functions of the plurality of face detection tasks are obtained through training according to the following manner:

training the respective corresponding loss functions jointly by using the classification task for a face target and the position regression task for a face target box as main tasks and using the position regression task for a facial landmark as an auxiliary task.

As can be seen from the foregoing technical solution, the face candidate region in the to-be-detected image is determined according to the face detection model including a plurality of stages of convolutional neural networks, and whether the face candidate region corresponds to a small-scale face is determined according to the size parameter of the face candidate region. If the face candidate region corresponds to a small-scale face, face detection is performed on the face candidate region by using the detection model configured to recognize the small-scale face. When face detection is performed on the face candidate region, the projection features of the face candidate region on the feature maps outputted by the at least two stages of convolutional neural networks in the face detection model are obtained. The at least two stages of convolutional neural networks include a first convolutional neural network and a second convolutional neural network, where the first convolutional neural network is determined according to the size parameter of the face candidate region, so that a feature resolution of the feature map outputted by the first convolutional neural network is relatively high and is applicable to detecting a face candidate region having the size parameter, and the second convolutional neural network is an adjacent-stage convolutional neural network of the first convolutional neural network. A feature resolution of the second convolutional neural network is not higher than that of the first convolutional neural network, but based on the characteristic of the face detection model, the feature map outputted by the second convolutional neural network carries more semantic information compared with the first convolutional neural network. Therefore, the fused feature obtained by fusing the projection feature of the first convolutional neural network and the projection feature of the second convolutional neural network not only has a higher feature resolution, but also carries more semantic information, which helps to detect small-scale faces. Therefore, when the fused feature is used as the projection feature of the first convolutional neural network and face detection is performed on the face candidate region according to the projection features of the at least two stages of convolutional neural networks, the detection precision of the small-scale faces may be improved.

Figure 14A:
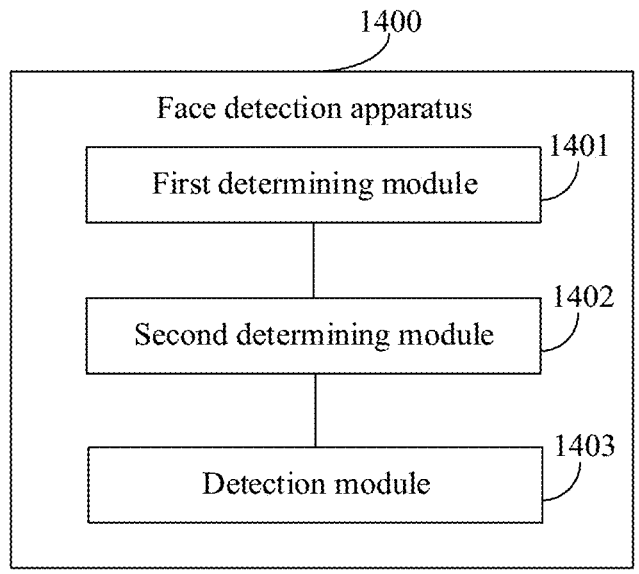
FIG. 14a is another schematic structural diagram of a face detection apparatus according to an embodiment of this disclosure.

Based on the face detection method provided in the embodiment corresponding to FIG. 12, an embodiment provides a face detection apparatus 1400. Referring to FIG. 14*a*, the apparatus 1400 includes: a first determining module 1401, a second determining module 1402, and a detection module 1403.

The first determining module 1401 is configured to determine a face candidate region in a to-be-detected image according to a face detection model.

The second determining module 1402 is configured to determine a target scale of a face corresponding to the face candidate region according to a size relationship between a size parameter of the face candidate region and a proportion condition, the target scale being one of a plurality of scales, and faces in different scales corresponding to different detection models.

The detection module 1403 is configured to perform face detection on the face candidate region according to a detection model corresponding to the face in the target scale.

In an implementation, the second determining module 1402 is specifically configured to:

determine that the target scale of the face corresponding to the face candidate region is a small scale in a case that the size parameter of the face candidate region is less than or equal to a first proportion condition; and determine that the target scale of the face corresponding to the face candidate region is a large scale in a case that the size parameter of the face candidate region is greater than a second proportion condition.

Figure 14B:
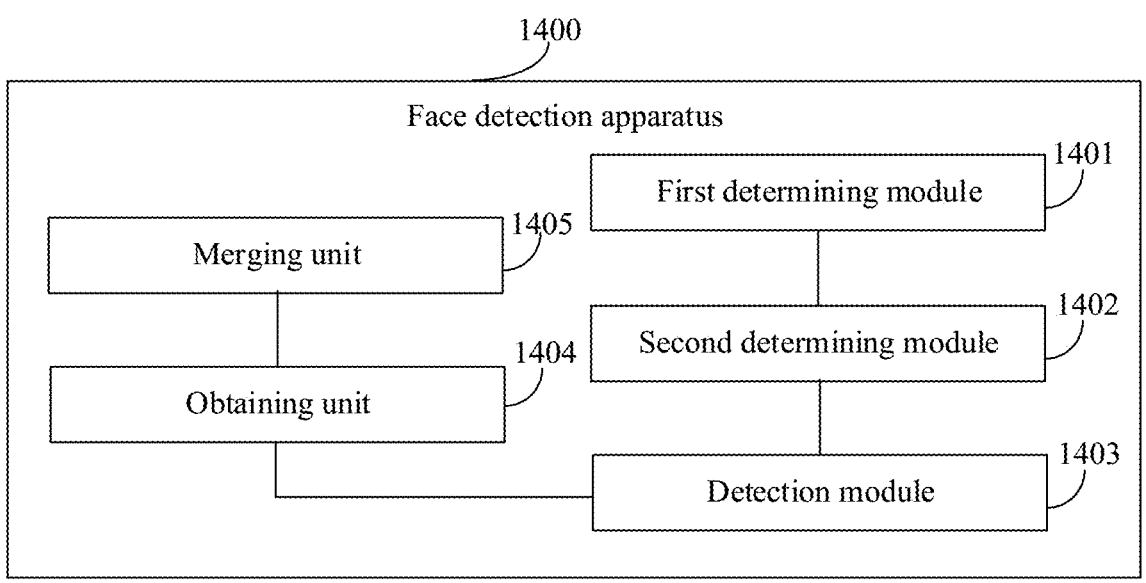
FIG. 14b is another schematic structural diagram of a face detection apparatus according to an embodiment of this disclosure.

In an implementation, the to-be-detected image includes a plurality of face candidate regions. Referring to FIG. 14*b*, the apparatus 1400 further includes: an obtaining unit 1404 and a merging unit 1405.

The obtaining unit 1404 is configured to obtain a plurality of face detection results of the plurality of face candidate regions respectively.

The merging unit 1405 is configured to merge the plurality of face detection results to obtain a face detection result of the to-be-detected image.

As can be seen, after the scale of the face corresponding to the face candidate region is determined by using the face detection apparatus provided in the embodiments of this disclosure, a corresponding detection model may be selected to perform face detection, to recognize faces in different scales.

Figure 15:
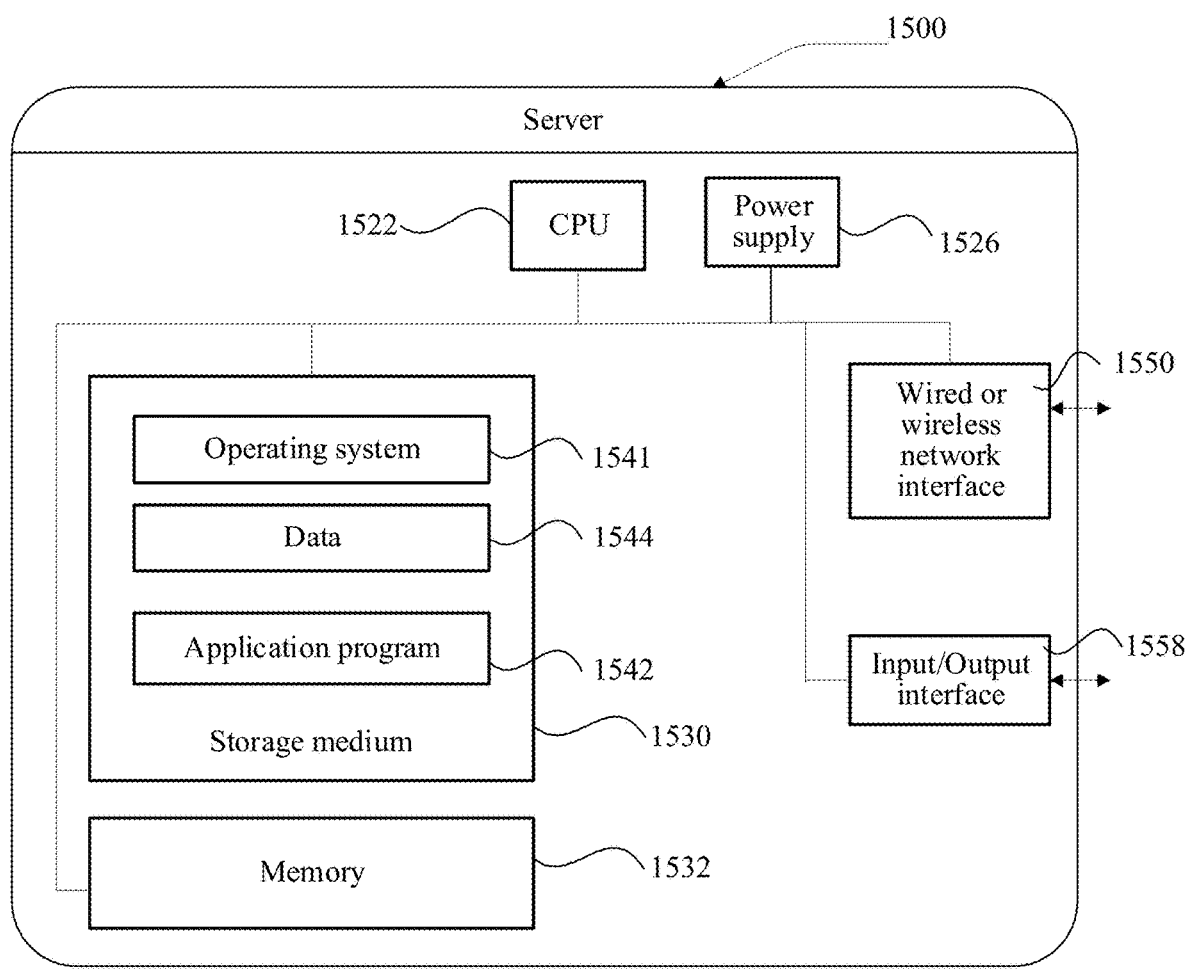
FIG. 15 is a schematic structural diagram of a face detection device according to an embodiment of this disclosure.

The embodiments of this disclosure further provide a face detection device, and the following describes the face detection device with reference to the accompanying drawings. Referring to FIG. 15, the embodiments of this disclosure further provide a face detection device 1500. The device 1500 may be a computing device such as a server and may vary greatly due to different configurations or performance, and may include one or more central processing units (CPUs) 1522 (for example, one or more processors) and a memory 1532, and one or more storage media 1530 (for example, one or more mass storage devices) that store an application program 1542 or data 1544. The memory 1532 and the storage medium 1530 may be transient or persistent storage. The program stored in the storage medium 1530 may include one or more modules (not shown in the figure), and each module may include a series of instruction operations for the server. Still further, the CPU 1522 may be configured to communicate with the storage medium 1530, and perform, on the face detection device 1500, the series of instruction operations in the storage medium 1530, to implement the face detection method according to any embodiment of this disclosure.

The face detection device 1500 may further include one or more power supplies 1526, one or more wired or wireless network interfaces 1550, one or more input/output interfaces 1558, and/or one or more operating systems 1541, for example, Windows Server™, Mac OS X™, Unix™, Linux™, or FreeBSD™.

The face detection method described in FIG. 2 to FIG. 9 performed in the foregoing embodiments may be based on the server structure shown in FIG. 15.

The CPU 1522 is configured to perform the following steps:

determining a face candidate region in a to-be-detected image according to a face detection model, the face detection model including a plurality of stages of convolutional neural networks;

determining that the face candidate region corresponds to a small-scale face in a case that a size parameter of the face candidate region is less than a first proportion condition; and performing face detection on the face candidate region by using a detection model corresponding to the small-scale face, where the performing face detection includes:

obtaining, by using the detection model, projection features of the face candidate region on feature maps outputted by at least two stages of convolutional neural networks in the face detection model, the at least two stages of convolutional neural networks including a first convolutional neural network and a second convolutional neural network, a feature resolution of a feature map outputted by the first convolutional neural network being applicable to the size parameter, an adjacent-stage convolutional neural network of the first convolutional neural network being the second convolutional neural network, and a feature resolution of a feature map outputted by the second convolutional neural network being lower than the feature resolution of the feature map outputted by the first convolutional neural network;

using a fused feature obtained by fusing a projection feature of the first convolutional neural network and a projection feature of the second convolutional neural network as a projection feature of the first convolutional neural network; and performing face detection on the face candidate region according to the projection features on the feature maps outputted by the at least two stages of convolutional neural networks.

The face detection method described in FIG. 12 performed in the foregoing embodiments may be based on the server structure shown in FIG. 15.

The CPU 1522 is configured to perform the following steps:

determining a face candidate region in a to-be-detected image according to a face detection model;

determining a target scale of a face corresponding to the face candidate region according to a size relationship between a size parameter of the face candidate region and a proportion condition, the target scale being one of a plurality of scales, and faces in different scales corresponding to different detection models; and performing face detection on the face candidate region according to a detection model corresponding to the face in the target scale.

Figure 16:
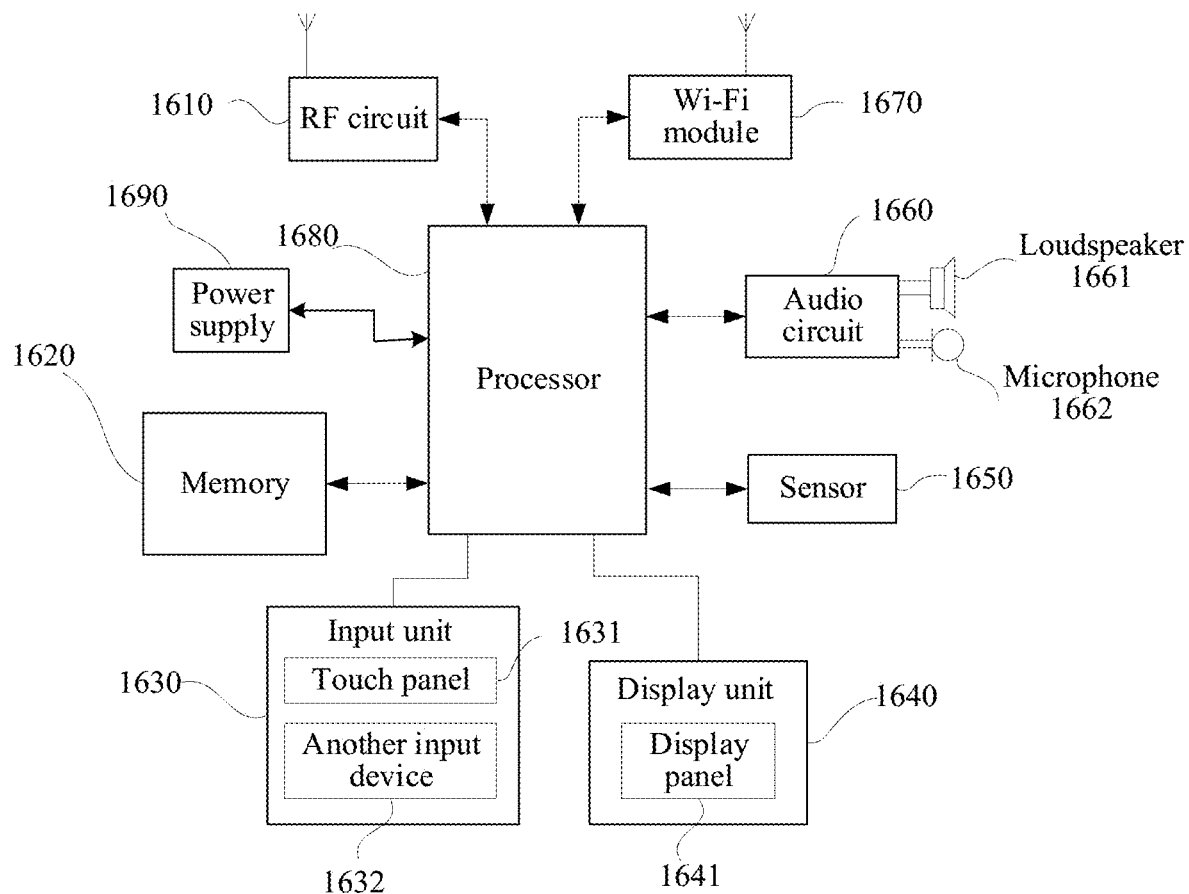
FIG. 16 is another schematic structural diagram of a face detection device according to an embodiment of this disclosure.

Referring to FIG. 16, the embodiments of this disclosure provide a face detection device 1600, and the device 1600 may alternatively be a computing device such as a terminal device. The terminal device may be any terminal device including a mobile phone, a tablet computer, a personal digital assistant (PDA), a point of sales (POS), or an on-board computer, and the terminal device being a mobile phone is used as an example.

FIG. 16 shows a block diagram of the structure of a part of a mobile phone related to a terminal device according to an embodiment of this disclosure. Referring to FIG. 16, the mobile phone includes components such as: a radio frequency (RF) circuit 1610, a memory 1620, an input unit 1630, a display unit 1640, a sensor 1650, an audio circuit 1660, a wireless fidelity (Wi-Fi) module 1670, a processor 1680, and a power supply 1690. A person skilled in the art may understand that the structure of the mobile phone shown in FIG. 16 does not constitute a limitation on the mobile phone, and the mobile phone may include more components or fewer components than those shown in the figure, or some components may be combined, or a different component deployment may be used.

The following makes a specific description of components of the mobile phone with reference to FIG. 16.

The RF circuit 1610 may be configured to receive and send signals during an information receiving and sending process or a call process. Specifically, the RF circuit receives downlink information from a base station, then delivers the downlink information to the processor 1680 for processing, and sends designed uplink data to the base station. Generally, the RF circuit 1610 includes, but is not limited to, an antenna, at least one amplifier, a transceiver, a coupler, a low noise amplifier (LNA), a duplexer, and the like. In addition, the RF circuit 1610 may further communicate with a network and another device through wireless communication. The wireless communication may use any communication standard or protocol, including, but not limited to a Global System for Mobile communications (GSM), a general packet radio service (GPRS), code division multiple access (CDMA), wideband code division multiple access (WCDMA), Long Term Evolution (LTE), an email, a short messaging service (SMS), and the like.

The memory 1620 may be configured to store a software program and module. The processor 1680 runs the software program and module stored in the memory 1620, to implement various functional applications and data processing of the mobile phone. The memory 1620 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 1620 may include a high speed random access memory (RAM), and may also include a non-volatile memory, for example, at least one magnetic disk storage device, a flash memory, or another volatile solid-state storage device.

The input unit 1630 may be configured to receive input digit or character information, and generate a key signal input related to the user setting and function control of the mobile phone. Specifically, the input unit 1630 may include a touch panel 1631 and another input device 1632. The touch panel 1631, also referred to as a touchscreen, may collect a touch operation of a user on or near the touch panel (such as an operation of a user on or near the touch panel 1631 by using any suitable object or accessory such as a finger or a stylus), and drive a corresponding connection apparatus according to a preset program. In the embodiments of this disclosure, the touch panel 1631 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 1680. Moreover, the touch controller can receive and execute a command sent from the processor 1680. In addition, the touch panel 1631 may be implemented by using various types, such as a resistive type, a capacitive type, an infrared type, and a surface acoustic wave type. In addition to the touch panel 1631, the input unit 1630 may further include the other input device 1632. Specifically, the another input device 1632 may include, but is not limited to, one or more of a physical keyboard, a functional key (for example, a volume control key or a switch key), a track ball, a mouse, and a joystick.

The display unit 1640 may be configured to display information inputted by the user or information provided for the user, and various menus of the mobile phone. The display unit 1640 may include a display panel 1641. In the embodiments of this disclosure, the display panel 1641 may be configured in the form of a liquid crystal display (LCD), an organic light-emitting diode (OLED), or the like. Further, the touch panel 1631 may cover the display panel 1641. After detecting a touch operation on or near the touch panel 1631, the touch panel transfers the touch operation to the processor 1680, to determine a type of a touch event. Then, the processor 1680 provides a corresponding visual output on the display panel 1641 according to the type of the touch event. Although in FIG. 16, the touch panel 1631 and the display panel 1641 are used as two separate parts to implement input and output functions of the mobile phone, in some embodiments, the touch panel 1631 and the display panel 1641 may be integrated to implement the input and output functions of the mobile phone.

The mobile phone may further include at least one sensor 1650 such as an optical sensor, a motion sensor, or another sensor. Specifically, the optical sensor may include an ambient light sensor and a proximity sensor. The ambient light sensor may adjust luminance of the display panel 1641 according to brightness of the ambient light. The proximity sensor may switch off the display panel 1641 and/or backlight when the mobile phone is moved to the ear. As one type of motion sensor, an accelerometer sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1660, a loudspeaker 1661, and a microphone 1662 may provide audio interfaces between the user and the mobile phone. The audio circuit 1660 may convert received audio data into an electrical signal and transmit the electrical signal to the loudspeaker 1661. The loudspeaker 1661 converts the electrical signal into a sound signal for output. On the other hand, the microphone 1662 converts a collected sound signal into an electrical signal. The audio circuit 1660 receives the electrical signal, converts the electrical signal into audio data, and outputs the audio data to the processor 1680 for processing. Then, the processor sends the audio data to, for example, another mobile phone by using the RF circuit 1610, or outputs the audio data to the memory 1620 for further processing.

Wi-Fi is a short distance wireless transmission technology. The mobile phone may help, by using the Wi-Fi module 1670, a user to receive and transmit an email, browse a web page, access stream media, and the like. This provides wireless broadband Internet access for the user. Although FIG. 16 shows the Wi-Fi module 1670, it may be understood that the Wi-Fi module is not a necessary component of the mobile phone, and the Wi-Fi module may be omitted as required provided that the scope of the essence of the present disclosure is not changed.

The processor 1680 is a control center of the mobile phone, and is connected to various parts of the entire mobile phone by using various interfaces and lines. By running or executing a software program and/or module stored in the memory 1620, and invoking data stored in the memory 1620, the processor executes various functions of the mobile phone and performs data processing, thereby monitoring the entire mobile phone. In the embodiments of this disclosure, the processor 1680 may include one or more processing units. In an embodiment of this disclosure, the processor 1680 may integrate an application processor and a modem processor. The application processor mainly processes an operating system, a user interface, an application program, and the like. The modem processor mainly processes wireless communication. It may be understood that the foregoing modem processor may either not be integrated into the processor 1680.

The mobile phone further includes the power supply 1690 (such as a battery) for supplying power to the components. In the embodiments of this disclosure, the power supply may be logically connected to the processor 1680 by using a power management system, thereby implementing functions such as charging, discharging, and power consumption management by using the power management system.

Although not shown in the figure, the mobile phone may further include a camera, a Bluetooth module, and the like, and details are not described herein again.

An embodiment of this disclosure further provides a computer-readable storage medium, configured to store program code, the program code being executable by a processor to implement any implementation in the face detection method described in the foregoing embodiments.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium may be at least one of the following media: any medium that can store program code, such as a read-only memory (ROM), a RAM, a magnetic disk, or an optical disc.

The embodiments in this specification are all described in a progressive manner, for same or similar parts in the embodiments, reference may be made to these embodiments, and each embodiment focuses on a difference from other embodiments. Especially, device and system embodiments are basically similar to the method embodiments, and therefore is described briefly; for related parts, reference may be made to partial descriptions in the method embodiments. The described device and system embodiments are merely exemplary. The units described as separate parts may or may not be physically separated, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments without creative efforts.

The foregoing descriptions are merely a specific implementation of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for face detection, performed by a computing device, the method comprising:
   determining a face candidate region in a to-be-detected image according to a face detection model, the face detection model comprising a plurality of stages of convolutional neural networks (CNNs) connected in serial with decreasing feature resolutions;
   determining a face scale of the face candidate region based on a size parameter of the face candidate region;
   constructing a detection model with a model structure determined based on the face scale of the face candidate region, the detection model being separate from the face detection model;
   generating, by using the detection model, projection features of the face candidate region onto feature maps outputted by at least two stages of CNNs from the plurality of stages of CNNs inside the face detection model, wherein:
      the at least two stages of CNNs include a reference CNN stage being selected among the plurality of stages of CNNs based on the size parameter of the face candidate region according to a mapping relation between the plurality of stages of CNNs and size parameters, the mapping relation being determined according to feature resolutions of the plurality of stages of CNNs and the size parameters, and the reference CNN stage being a stage of CNN having the highest feature resolution or the lowest feature resolution among the at least two stages of CNNs; and
   performing face detection on the face candidate region according to the projection features on the feature maps outputted by the at least two stages of CNNs.

2. The method according to claim 1, wherein the size parameter of the face candidate region comprises one of:
   an absolute size parameter comprising one of: an area, a length, or a width of the face candidate region; or
   a relative size parameter comprising a ratio between a size of the face candidate region and a size of the to-be-detected image.

3. The method according to claim 1, further comprising:
   in response to the size parameter of the face candidate region being less than a first predetermined proportion condition or a first predetermined threshold condition, constructing the detection model with a model structure corresponding to a small-scale face; and
   before performing the face detection:
      setting the reference CNN stage as the first CNN having the highest feature resolution among the at least two stages of CNNs, and selecting an adjacent stage of the first CNN having a lower feature resolution as the second CNN, the feature resolution of the feature map outputted by the first CNN corresponding to the size parameter associated with the small-scale face;
      fusing the projection feature of the first CNN and the projection feature of the second CNN to obtain a fused feature; and
      updating the projection feature of the first CNN with the fused feature.

4. The method according to claim 3, wherein fusing the projection feature of the first CNN and the projection feature of the second CNN comprises:
   obtaining a first feature by reducing a channel number in the projection feature of the first CNN;
   obtaining a second feature by improving the feature resolution of the projection feature of the second CNN to match the feature resolution of the projection feature of the first CNN; and
   performing a pixel addition operation on the first feature and the second feature to obtain the fused feature.

5. The method according to claim 1, further comprising:
   in response to the size parameter of the face candidate region being greater than a second predetermined proportion condition or a second predetermined threshold condition, constructing the detection model with a model structure corresponding to a large-scale face, the at least two stages of CNNs comprising a first CNN, a second CNN, and a third CNN with decreasing feature resolutions;
   setting the reference CNN stage as the third CNN having the lowest feature resolution among the at least two stages of CNNs, and a feature resolution of a feature map outputted by the third CNN being corresponding to the size parameter associated with the large-scale face; and
   performing face detection on the face candidate region according to the projection features on the feature maps outputted by the at least two stages of CNNs without a fusing process.

6. The method according to claim 1, wherein performing face detection on the face candidate region comprises:
   setting a weight coefficient for each of the at least two stages of CNNs, wherein the weight coefficient of a stage of the at least two stages of CNNs whose feature resolution is corresponding to the size parameter is greater than the weight coefficient of another stage of the at least two stages of CNNs; and performing the face detection on the face candidate region according to the projection feature and weight coefficient of each of the at least two stages of CNNs.

7. The method according to claim 1, wherein determining the face candidate region in the to-be-detected image according to the face detection model comprises:

obtaining a face region of interest (ROI) in the to-be-detected image;

projecting the face ROI onto a feature map outputted by the face detection model to obtain a first feature map;

generating an anchor box on the first feature map to obtain a second feature map; and calculating a face candidate region in the second feature map according to loss functions of a plurality of face detection tasks, and using a determined face candidate region in the second feature map as the face candidate region of the to-be-detected image.

8. The method according to claim 7, wherein generating the anchor box on the first feature map to obtain the second feature map comprises:

in response to a central point of the anchor box not overlapping with the face ROI, enlarging a window step size of the anchor box.

9. The method according to claim 7, wherein the plurality of face detection tasks comprise a classification task for a face target, a position regression task for a face target box, and a position regression task for a facial landmark, and the loss functions of the plurality of face detection tasks are obtained through training according to a following manner:

training the loss functions jointly by using the classification task for a face target and the position regression task for a face target box as main tasks and using the position regression task for a facial landmark as an auxiliary task.

10. A method for face detection, performed by a computing device, the method comprising:

determining a face candidate region in a to-be-detected image according to a face detection model;

determining a target scale of a face corresponding to the face candidate region according to a size parameter of the face candidate region and a predetermined condition, the target scale being one of a plurality of scales, and faces in different target scales corresponding to different structures of detection models, the different structures of detection models being separated from the face detection model; and performing face detection on the face candidate region according to a detection model structure corresponding to the target scale of the face, wherein for a plurality of face candidate regions included in the to-be-detected image, targeted face detection is performed on the face candidate region by adaptively selecting, according to a size parameter of each face candidate region, a detection model corresponding to the size parameter; and wherein each detection model is used to generate projection features of the face candidate region onto feature maps outputted by at least two stages of convolutional neural networks (CNNs) from a plurality of stages of CNNs inside a face detection model, the at least two stages of CNNs include a reference CNN stage being adaptively selected among the plurality of stages of CNNs based on the size parameter of the face candidate region according to a mapping relation between the plurality of stages of CNNs and size parameters, the mapping relation being determined according to feature resolutions of the plurality of stages of CNNs and the size parameters, and the reference CNN stage being a stage of CNN having the highest feature resolution or the lowest feature resolution among the at least two stages of CNNs.

11. The method according to claim 10, wherein determining the target scale of the face comprises:

determining that the target scale of the face corresponding to the face candidate region is a small scale when the size parameter of the face candidate region is less than or equal to a first predetermined proportion condition or a first predetermined threshold condition; and determining that the target scale of the face corresponding to the face candidate region is a large scale when the size parameter of the face candidate region is greater than a second predetermined proportion condition or a second predetermined threshold condition.

12. The method according to claim 10, the to-be-detected image comprising a plurality of face candidate regions, and the method further comprising:

obtaining a face detection result for each of the plurality of face candidate regions; and merging the face detection result for the each of the plurality of face candidate regions to obtain a face detection result of the to-be-detected image.

13. A device for face detection, comprising a memory for storing computer instructions and a processor in communication with the memory, wherein, when the processor executes the computer instructions, the processor is configured to cause the device to:

determine a face candidate region in a to-be-detected image according to a face detection model, the face detection model comprising a plurality of stages of convolutional neural networks (CNNs) connected in series with decreasing feature resolutions;

determine a face scale of the face candidate region based on a size parameter of the face candidate region;

construct a detection model with a model structure determined based on the face scale of the face candidate region, the detection model being separate from the face detection model;

generate, by using the detection model, projection features of the face candidate region onto feature maps outputted by at least two stages of CNNs from the plurality of stages of [the]] CNNs inside the face detection model, wherein:

the at least two stages of CNNs include a reference CNN stage being selected among the plurality of stages of CNNs based on the size parameter of the face candidate region according to a mapping relation between the plurality of stages of CNNs and size parameters, the mapping relation being determined according to feature resolutions of the plurality of stages of CNNs and the size parameters, and the reference CNN stage being a stage of CNN having the highest feature resolution or the lowest feature resolution among the at least two stages of CNNs; and perform face detection on the face candidate region according to the projection features on the feature maps outputted by the at least two stages of CNNs.

14. The device according to claim 13, wherein the size parameter of the face candidate region comprises one of:

an absolute size parameter comprising one of: an area, a length, or a width of the face candidate region; or a relative size parameter comprising a ratio between a size of the face candidate region and a size of the to-be-detected image.

15. The device according to claim 13, wherein:
when the processor is configured to cause the device to select the detection model, the processor is configured to cause the device to:
in response to the size parameter of the face candidate region being less than a first predetermined proportion condition or a first predetermined threshold condition, construct the detection model with a model structure corresponding to a small-scale face; and
before the processor is configured to cause the device to perform the face detection, the processor is configured to further cause the device to:
set the reference CNN stage as the first CNN having the highest feature resolution among the at least two stages of CNNs, and select an adjacent stage of the first CNN having a lower feature resolution as the second CNN, the feature resolution of the feature map outputted by the first CNN corresponding to the size parameter associated with the small-scale face;
fuse the projection feature of the first CNN and the projection feature of the second CNN to obtain a fused feature; and
update the projection feature of the first CNN with the fused feature.

16. The device according to claim 15, wherein, when the processor is configured to cause the device to fuse the projection feature of the first CNN and the projection feature of the second CNN, the processor is configured to cause the device to:
obtain a first feature by reducing a channel number in the projection feature of the first CNN;
obtain a second feature by improving the feature resolution of the projection feature of the second CNN to match the feature resolution of the projection feature of the first CNN; and
perform a pixel addition operation on the first feature and the second feature to obtain the fused feature.

17. The device according to claim 13, wherein:
when the processor is configured to cause the device to select the detection model, the processor is configured to cause the device to:
in response to the size parameter of the face candidate region being greater than a second predetermined proportion condition or a second predetermined threshold condition, construct the detection model with a model structure corresponding to a large-scale face, the at least two stages of CNNs comprising a first CNN, a second CNN, and a third CNN with decreasing feature resolutions;
set the reference CNN stage as the third CNN having the lowest feature resolution among the at least two stages of CNNs, and a feature resolution of a feature map outputted by the third CNN being corresponding to the size parameter associated with the large-scale face; and
perform face detection on the face candidate region according to the projection features on the feature maps outputted by the at least two stages of CNNs without a fusing process.

18. The device according to claim 13, wherein, when the processor is configured to cause the device to perform the face detection on the face candidate region, the processor is configured to cause the device to:
set a weight coefficient for each of the at least two stages of CNNs, wherein the weight coefficient of a stage of the at least two stages of CNNs whose feature resolution is corresponding to the size parameter is greater than the weight coefficient of another stage of the at least two stages of CNNs; and
perform the face detection on the face candidate region according to the projection feature and weight coefficient of each of the at least two stages of CNNs.

19. The device according to claim 13, wherein, when the processor is configured to cause the device to determine the face candidate region in the to-be-detected image according to the face detection model, the processor is configured to cause the device to:
obtain a face region of interest (ROI) in the to-be-detected image;
project the face ROI onto a feature map outputted by the face detection model to obtain a first feature map;
generate an anchor box on the first feature map to obtain a second feature map; and
calculate a face candidate region in the second feature map according to loss functions of a plurality of face detection tasks, and use a determined face candidate region in the second feature map as the face candidate region of the to-be-detected image.

20. The device according to claim 19, wherein, when the processor is configured to cause the device to generate the anchor box on the first feature map to obtain the second feature map, the processor is configured to cause the device to:
in response to a central point of the anchor box not overlapping with the face ROI, enlarge a window step size of the anchor box.

* * * * *

UNITED STATES PATENT AND TRADEMARK OFFICE
CERTIFICATE OF CORRECTION

PATENT NO.       : 12,046,012 B2
APPLICATION NO.  : 17/325862
DATED            : July 23, 2024
INVENTOR(S)      : Wenqi Wu, Zexiong Ye and Wanpeng Xiao It is certified that error appears in the above-identified patent and that said Letters Patent is hereby corrected as shown below:

In the Claims

In Column 38, Claim 13, Line 47, delete "[the]]" between of and CNNs.

Signed and Sealed this
Tenth Day of September, 2024

Katherine Kelly Vidal
*Director of the United States Patent and Trademark Office*